US012793102B1

(12) United States Patent
Shimizu et al.

(10) Patent No.: US 12,793,102 B1
(45) Date of Patent: Nov. 10, 2026

(54) DOOH AD EXPOSURE OR CONVERSION TRACKING USING TRANSACTION DATA

(71) Applicant: ABCS INSIGHTS Inc., Kissimmee, FL (US)

(72) Inventors: Jerome Shimizu, Kissimmee, FL (US); Michael Sheng, Orlando, FL (US)

(73) Assignee: ABCS INSIGHTS INC., Kissimmee, FL (US)

( * ) Notice: Subject to any disclaimer, the term of this patent is extended or adjusted under 35 U.S.C. 154(b) by 0 days.

(21) Appl. No.: 19/293,830

(22) Filed: Aug. 7, 2025

Related U.S. Application Data

(60) Provisional application No. 63/776,813, filed on Mar. 24, 2025.

(51) Int. Cl.
*G06Q 30/0242* (2023.01)

(52) U.S. Cl.
CPC ................................ *G06Q 30/0246* (2013.01)

(58) Field of Classification Search
CPC .................................................. G06Q 30/0246
USPC ........................................... 705/14.45, 14.41
See application file for complete search history.

(56) References Cited

U.S. PATENT DOCUMENTS

2022/0207571 A1* 6/2022 Martin .................... H04W 4/23
2023/0098800 A1* 3/2023 Benner ............. G06Q 30/0205 705/14.41

OTHER PUBLICATIONS

Nicole Genchur, Geolocation Advertising: A Guide to Geolocation Data for Marketers, 2020 (Year: 2020).*

* cited by examiner

*Primary Examiner* — Tarek Elchanti
(74) *Attorney, Agent, or Firm* — SCHWEGMAN LUNDBERG & WOESSNER, P.A.

(57) ABSTRACT

The disclosed system leverages structured transaction data, which includes itemized purchase details, timestamps, and store locations. By integrating this data with ad display records, geolocation tracking, and consumer movement patterns, the system applies attribution models to determine whether an ad influenced a purchase. Confidence scores are assigned to ad-purchase correlations, enabling accurate attribution and campaign optimization. Additionally, the system supports multi-touchpoint tracking, analyzing cross-channel ad exposures across DOOH, mobile, in-store, and digital ads. Through continuous learning and model refinement, the system adapts to consumer behavior and market trends, ensuring real-time attribution accuracy. This approach improves ad spend efficiency, enhances conversion tracking, and provides advertisers with data-driven insights for optimizing future campaigns.

20 Claims, 9 Drawing Sheets

DOOH AD EXPOSURE OR CONVERSION TRACKING USING TRANSACTION DATA

BACKGROUND

Ad exposure technology measures whether and how consumers interact with advertisements across various mediums, including digital, out-of-home, in-store, and broadcast channels. These systems estimate ad reach and effectiveness. Ad exposure technology plays a crucial role in advertising analytics by tracking when, where, and how consumers encounter advertisements across multiple platforms. These technologies help attribute conversions to specific marketing touchpoints, distinguishing between direct and indirect influences on consumer behavior.

CLAIM OF PRIORITY

This application claims the benefit of priority to U.S. Provisional Application Ser. No. 63/776,813, filed on Mar. 24, 2025, which is incorporated herein by reference in its entirety.

BRIEF SUMMARY

Some embodiments pertain to innovative systems and methodologies for tracking and analyzing consumer exposure to digital out-of-home (DOOH) advertisements across various locations, including retail stores, transportation hubs, public venues, and digital signage networks. These operations include detecting ad exposure, linking exposure to consumer transactions, attributing purchases to marketing touchpoints, analyzing multi-touch consumer journeys, and optimizing DOOH ad placement using data-driven insights. The disclosed systems and methods leverage Mobile Advertising Identifiers (MAIDs), transaction data, geolocation tracking, and AI-driven modeling to address challenges associated with traditional DOOH attribution methods, which often rely solely on geofencing or mobile device proximity tracking.

BRIEF DESCRIPTION OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
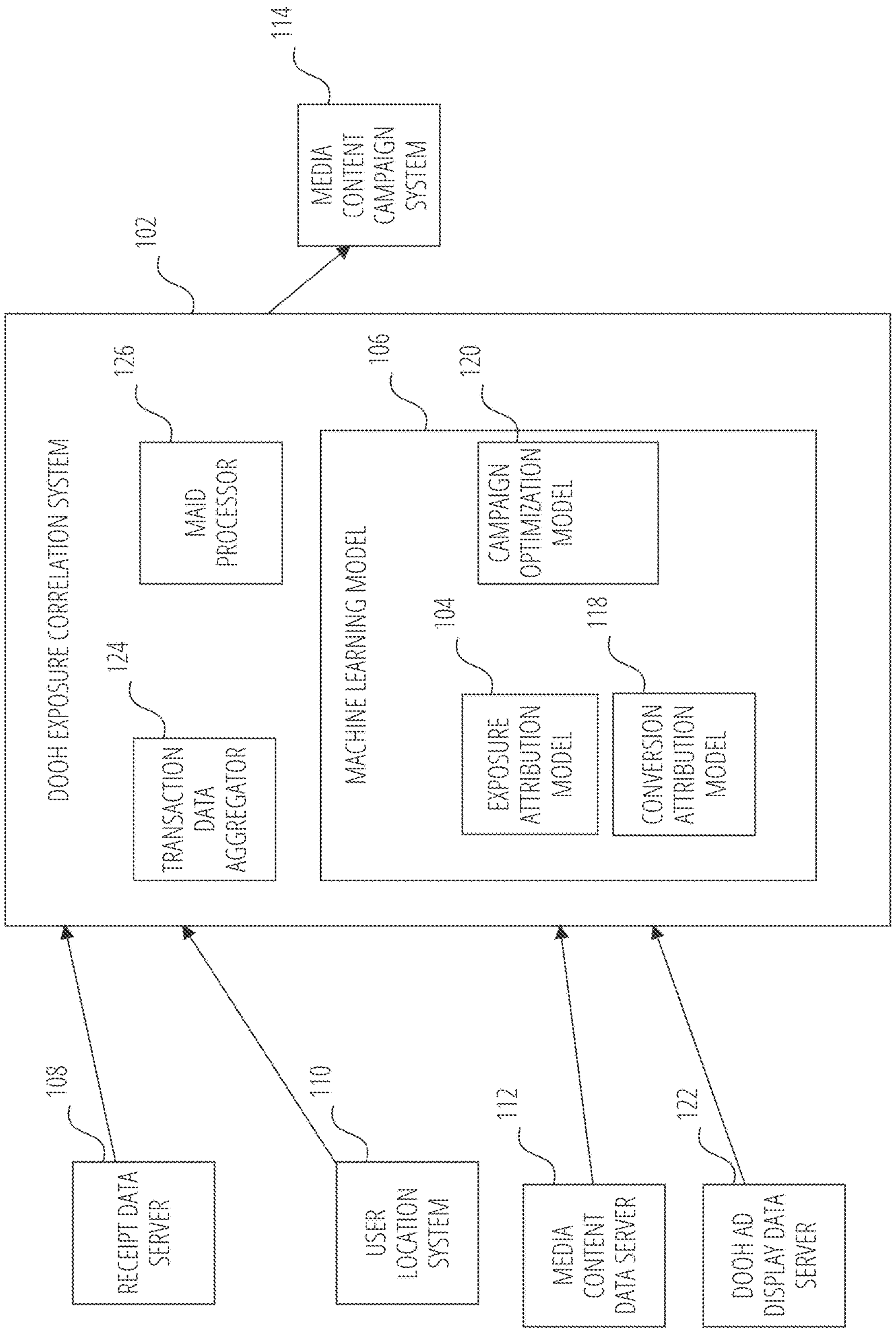
FIG. 1 illustrates an example architecture for linking ad content items with receipt content items, according to some examples.

Traditional advertising attribution systems that rely solely on credit card transaction data face significant challenges in accurately measuring ad effectiveness. These systems typically track purchases at the merchant level, capturing the transaction amount and store location but lacking product-level details. For example, when a consumer shops at a grocery store, traditional models can confirm that a purchase occurred at that store but cannot determine whether the consumer bought the specific advertised product. This limitation prevents advertisers from directly linking ad exposure to sales, making it difficult to assess the true impact of an ad.

Because credit card transaction data lacks itemized product details, traditional systems must rely on probabilistic models and assumptions to estimate whether an ad influenced a purchase. If a consumer sees a DOOH ad for a particular beverage and later shops at a grocery store, the system can only verify that a purchase was made but cannot confirm whether the advertised beverage was among the purchased items. This lack of direct correlation forces advertisers to infer ad effectiveness based on aggregate sales trends, reducing precision in attribution modeling.

Additionally, credit card-based attribution models struggle to track cross-store and cross-channel purchases. If a consumer sees an ad at one location but makes the purchase at another store, traditional systems fail to establish a connection between initial ad exposure and later transaction events. This issue is further compounded when consumers buy multiple products in a single transaction, making it impossible to isolate ad-driven purchases from unrelated items bought out of habit or necessity. As a result, these systems provide imprecise return on ad spend (ROAS) calculations, limiting advertisers' ability to optimize campaigns based on actual product conversions.

Another critical limitation of credit card-based attribution is the lack of multi-touchpoint tracking. These systems only record final point-of-sale transactions, without capturing whether a consumer engaged with an ad through multiple channels-such as DOOH displays, in-store promotions, mobile ads, or connected TV (CTV) commercials-before making a purchase. Without this cross-channel context, advertisers cannot accurately determine which ad interactions contributed most to the final purchase, leading to inefficient ad spend allocation.

Embodiments described herein improve upon traditional attribution systems by incorporating DOOH exposure data, receipt-level transactions, and geolocation tracking to establish direct ad-to-purchase correlations. Unlike systems that only analyze merchant-level credit card data, the ad tracking system leverages structured receipt data, which includes detailed itemized purchases, timestamps, and store identifiers. This allows the system to directly correlate an advertisement to an actual product purchase, eliminating the guesswork of conventional attribution models.

The system integrates DOOH ad display records with receipt data, ensuring precise ad exposure tracking. The system not only determines where and when an ad was shown but also which consumers were exposed to it, based on geolocation tracking, receipt validation, and store movement data. If a consumer enters a retail store and purchases an item shortly after seeing a DOOH ad, the system can assign a confidence score to the correlation, distinguishing between habitual purchases and ad-driven sales. By leveraging time-based, location-based, and movement-based correlations, the system provides superior attribution accuracy compared to credit card-based models, which lack these granular insights.

Additionally, the system enables multi-touchpoint tracking, allowing advertisers to analyze how different ad channels influence purchasing decisions. Traditional models fail to measure ad effectiveness across multiple interactions, but the system consolidates DOOH, mobile, CTV, and digital ad engagements to build a comprehensive attribution model. Machine learning techniques identify patterns of ad influence, ensuring that all contributing ad exposures are considered in determining the most effective marketing channels.

Another key feature of the system is its continuous learning and retraining mechanisms. Unlike static attribution models, the system dynamically updates its correlation algorithms based on real-time transaction data, evolving consumer behavior, and shifting ad exposure trends. By applying AI-driven confidence scoring, machine learning classifiers, and predictive analytics, the system ensures that advertisers receive highly accurate, data-driven insights into which ads drive sales. These insights enable real-time campaign optimization, ensuring that high-performing ads receive increased exposure while ineffective placements are adjusted or removed.

By integrating DOOH ad exposure tracking, structured transaction data, and AI-powered attribution models, the system overcomes the deficiencies of credit card-based attribution methods. Advertisers gain precise, actionable insights that allow them to refine ad targeting, allocate marketing budgets efficiently, and maximize return on investment (ROI).

Architecture for DOOH Ad Exposure Correlation and Attribution

FIG. 1 illustrates an example system architecture for determining digital out-of-home (DOOH) advertisement exposure and attributing subsequent consumer transactions to those exposures, according to some implementations. The architecture integrates data from multiple external sources—including a receipt data server 108, a user location system 110, a media content data server 112, and a DOOH ad display data server 112—into a centralized DOOH Exposure Correlation System 102. The DOOH Exposure Correlation System 102 includes a Transaction Data Aggregator 124 that collects and normalizes purchase-related records, and a MAID Processor 126 that maps Mobile Advertising Identifiers (MAIDs) or other user-linked identifiers across the input datasets.

The DOOH Exposure Correlation System 102 further includes a machine learning model 106, which comprises an Exposure Attribution Model 104, a Conversion Attribution Model 118, and a Campaign Optimization Model 120. These models collectively analyze geolocation, receipt, and ad display data to assign exposure confidence scores, determine conversion relationships, and generate optimization recommendations. The results are output to a media content campaign system 114, which executes real-time ad targeting and retargeting strategies based on the correlation analysis. The architecture enables fine-grained, multi-touchpoint attribution modeling for DOOH advertising across retail, public, and digital environments.

The receipt data server 108 stores and processes electronic receipt data that reflects item-level transaction details from various commercial entities. This data may originate from point-of-sale (POS) systems, mobile payment platforms, digital wallet services, retailer loyalty programs, or third-party receipt aggregators. The receipt data server 108 may receive or query structured purchase records in formats such as JSON, XML, or encrypted database entries. These records include itemized product descriptions, quantities, prices, timestamps, store locations, and merchant identifiers, enabling precise reconstruction of consumer purchasing behavior. Each receipt is associated with a particular user through an identifier-such as a hashed user ID, loyalty program ID, or device-linked MAID-allowing the system to link receipt content items with other datasets such as ad display logs and geolocation signals. The receipt data server 108 supports both real-time and batch ingestion of receipts, enabling dynamic ad-to-purchase correlation and longitudinal tracking of consumer responses to digital out-of-home (DOOH) advertising.

The user location system 110 captures and processes geolocation data associated with users to determine their physical proximity to digital out-of-home (DOOH) advertisement displays. This system ingests location signals from mobile devices, which may include GPS coordinates, Wi-Fi positioning, Bluetooth beacon proximity, and motion sensor data. In some implementations, the user location system 110 also integrates with in-store technologies such as RFID-tagged carts, smart shelf sensors, or connected retail infrastructure to enhance indoor positioning accuracy. The system constructs historical movement trails and records timestamps associated with user presence within or near advertising environments. These location trails are analyzed to determine whether a user was within a predefined distance or visual field of an ad display during the time the ad was shown. The user location system 110 enables the generation of exposure probability scores based on spatial and temporal overlap between user paths and known ad placements. This geospatial intelligence is critical for identifying likely ad exposures and supports multi-touchpoint attribution modeling across physical retail, public venues, and transit locations.

The media content data server 112 stores metadata associated with advertising content, including information about the product or service being promoted, brand identity, campaign parameters, targeting strategies, and creative attributes such as images, text, video, and messaging. This server provides contextual information that supplements ad display logs, allowing the system to understand not just when and where an advertisement appeared, but also what content was shown and which marketing objectives it served. In some implementations, the media content data server 112 interfaces with content management systems used by advertisers or retailers, ingesting structured ad descriptors, product SKUs, category labels, and campaign identifiers. The server enables correlation of specific media content items with purchase behavior at the item level rather than the merchant level, supporting refined attribution and campaign performance analysis. This contextual data is leveraged by the DOOH exposure correlation system to differentiate between ad types, assess content effectiveness, and support campaign optimization models.

The DOOH Ad Display Data Server 122 stores structured logs that indicate when, where, and how digital out-of-home (DOOH) advertisements were displayed. These logs typically include timestamps, screen identifiers, ad rotation schedules, and precise physical locations of display units such as in-store digital signage, smart grocery carts, public billboards, and connected TV interfaces. In some cases, the display server also records screen orientation, playback duration, and display context (e.g., aisle number, store section, or transit gate). The DOOH Ad Display Data Server 122 may ingest records from ad servers, signage networks, or retailer media platforms, ensuring that every displayed advertisement is captured with high spatial and temporal resolution. This data is critical for exposure attribution, as it allows the system to determine whether a user was physically present near an active ad display during its runtime. The display logs from server 122 are integrated with user geolocation trails and receipt-level transaction data to identify potential ad exposure events and enable high-confidence ad-to-purchase correlation.\

The DOOH Exposure Correlation System 102 serves as the central processing hub that receives, integrates, and analyzes data from multiple input sources to determine whether a user was exposed to a digital out-of-home (DOOH) advertisement and whether that exposure influenced a subsequent purchase. It ingests structured data from the receipt data server, user location system, media content data server, and DOOH ad display data server, each providing critical signals for linking advertisement events to consumer behavior. The system performs cross-referencing and correlation operations across these disparate datasets, establishing temporal and spatial relationships between ad exposures and transaction events. By unifying movement data, ad display logs, and item-level purchase records under a user-level identifier, the DOOH Exposure Correlation System 102 enables high-precision attribution modeling. This system outputs exposure and conversion insights, including confidence scores and attribution metrics, which serve as inputs for downstream campaign optimization and execution.

The media content campaign system 114 is responsible for executing advertising strategies based on insights generated by the DOOH exposure correlation system. It receives output such as exposure likelihood scores, conversion attributions, and performance metrics, and uses this information to dynamically adjust ongoing or future advertising campaigns. In some implementations, the media content campaign system 114 modifies which ads are displayed, where they are placed, how frequently they appear, and which audience segments are targeted. This system may coordinate with external ad delivery networks, digital signage controllers, and mobile advertising platforms to reallocate ad spend, initiate retargeting sequences, or update creative content in response to real-world performance data. By implementing data-driven campaign adjustments in real time, the media content campaign system 114 ensures that advertising resources are continually optimized toward the most effective placements, messages, and channels.

The Transaction Data Aggregator 124 is responsible for collecting and unifying purchase-related data from a variety of sources to enable accurate attribution analysis. While the receipt data server may provide detailed item-level transaction records, the aggregator 124 complements this by ingesting additional transaction data streams such as point-of-sale logs, loyalty program activity, mobile payment records, digital wallet transactions, and e-commerce receipts. These data streams may originate from different retailers, payment providers, or third-party platforms, and may arrive in diverse formats and levels of granularity. The Transaction Data Aggregator 124 standardizes this information into a common data model that includes timestamps, merchant identifiers, store locations, product identifiers, and payment metadata. By integrating these heterogeneous sources into a cohesive dataset, the aggregator enables the DOOH exposure correlation system to link transactions with specific advertisement exposures and supports multi-channel, multi-location attribution modeling.

The MAID Processor 126 links user identity signals across disparate datasets by resolving mobile advertising identifiers (MAIDs), hashed user IDs, or other anonymized identifiers into a unified user profile. Because the system ingests data from independent sources—such as mobile devices, ad display servers, and transaction databases—each using potentially different identity schemes, the MAID Processor 126 plays a critical role in enabling user-level attribution. It matches identifiers across geolocation data, ad exposure records, and purchase history, ensuring that all correlated events pertain to the same individual or household. In some implementations, the processor may apply probabilistic matching or deterministic linking techniques based on device metadata, session tokens, loyalty IDs, or shared attributes. This identifier resolution is essential for accurately assigning ad exposure and conversion events to individual users, thereby enhancing the precision of the attribution models and reducing the risk of false correlations.

The machine learning model 106 operates within the DOOH exposure correlation system and serves as the analytical engine that interprets input data to infer relationships between advertisement exposures and consumer behavior. It processes structured data inputs including geolocation trails, ad display logs, itemized receipt records, and user identifiers, and applies predictive modeling to identify meaningful patterns across these sources. The model is trained on historical consumer behavior and real-time interactions to enhance attribution accuracy, reduce false positives, and dynamically adapt to emerging trends. The machine learning model 106 includes multiple submodels tailored to specific analytical tasks, such as detecting ad exposure events, assessing conversion likelihood, and generating actionable recommendations for campaign optimization. These models use techniques such as classification, regression, ensemble learning, and time-series analysis to produce probabilistic outputs and confidence scores, supporting fine-grained attribution and strategic decision-making.

The Exposure Attribution Model 104 determines whether a user was likely exposed to a particular digital out-of-home (DOOH) advertisement based on the spatial and temporal alignment of the user's location data and the ad display log. It evaluates proximity thresholds, movement trajectories, dwell times, and field-of-view estimates to assess the plausibility of an exposure event. The model ingests real-time and historical geolocation signals along with precise ad display timestamps and locations, and applies statistical or machine learning methods to generate exposure probability scores. These scores reflect the system's confidence that a user physically encountered a specific advertisement. By integrating behavioral context and environmental variables, the Exposure Attribution Model 104 enables accurate filtering of incidental proximity and ensures that downstream conversion analysis is grounded in verified ad impressions.

The Conversion Attribution Model 118 evaluates whether a verified ad exposure resulted in a consumer purchase, and if so, how much influence the exposure had on the transaction. It analyzes correlations between the user's exposure history and subsequent item-level purchase records, considering variables such as time-to-purchase, location proximity, product match, and multi-touchpoint reinforcement across channels. The model may use logistic regression, decision trees, or neural networks to predict the likelihood that a specific ad exposure contributed to a transaction. It also supports weighted attribution approaches, such as time decay or multi-touch models, to more accurately reflect the influence of each touchpoint in the customer journey. The output of the Conversion Attribution Model 118 includes impact scores and attribution weights, which quantify how strongly a particular ad contributed to a user's decision to buy the advertised product.

The Campaign Optimization Model 120 analyzes attribution results to recommend adjustments that improve the performance of ongoing or future advertising campaigns. It processes exposure and conversion metrics to identify high-performing placements, underperforming locations, effective creatives, and user segments with high responsiveness. The model applies machine learning techniques to detect patterns in consumer engagement and predict which ad configurations are likely to yield better outcomes. Based on these insights, the Campaign Optimization Model 120 generates actionable recommendations, such as reallocating ad spend to better-performing screens, modifying targeting strategies, or adjusting the frequency and timing of ad displays. These recommendations are transmitted to the media content campaign system, enabling real-time campaign tuning and long-term strategic refinement. By learning from live campaign data and historical trends, the optimization model ensures that advertisers continuously improve return on investment (ROI) and audience impact.

Attribution Module to Link DOOH Ad Data with Transaction Data

Figure 2:
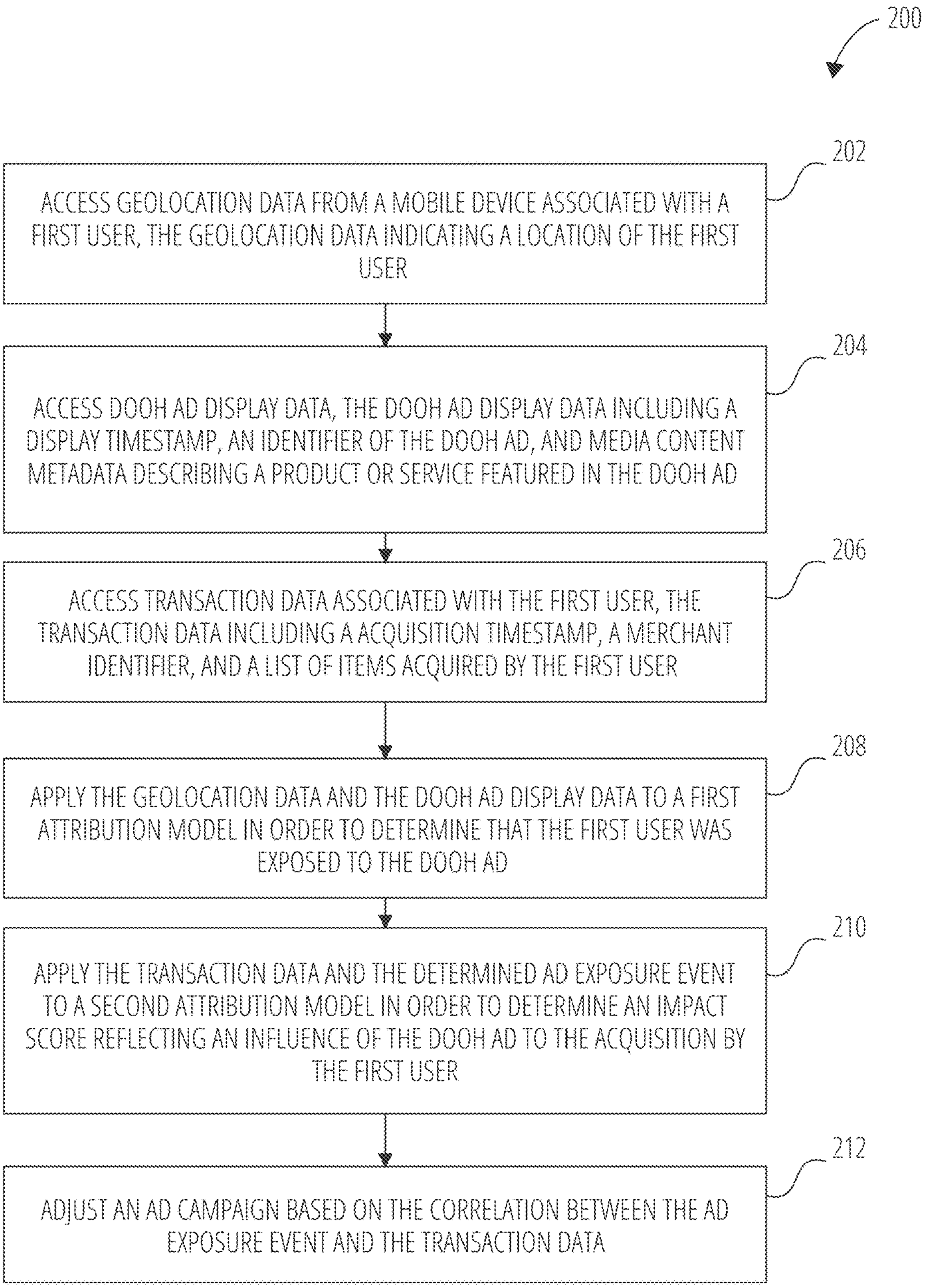
FIG. 2 illustrates an example method for associating digital out-of-home (DOOH) advertisement data with consumer transaction records to identify exposure or conversion, according to some examples.

FIG. 2 illustrates an example method 200 for associating digital out-of-home (DOOH) advertisement data with consumer transaction records to identify exposure or conversion, according to some examples. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

Geolocation

At block 202, the ad tracking system accesses geolocation data from a mobile device associated with a first user. The geolocation data can indicate a location of the first user. The system retrieves geolocation data from a computing device associated with a first user to determine the user's presence within a defined physical environment where a digital out-of-home (DOOH) advertisement is displayed.

The geolocation data is used to establish whether the first user was in proximity to an advertisement location, enabling further attribution analysis. The system may not rely solely on a single data source for location tracking, but instead can utilize multiple technologies to increase accuracy and adaptability across different environments.

To gather location information, the system may use one or more geolocation data sources, including but not limited to: geofencing via mobile devices (e.g., detecting a user's presence within a specific geographic boundary based on GPS, Wi-Fi signal triangulation, or cellular tower positioning), bluetooth beacon detection (e.g., identifying when a user comes within range of an in-store Bluetooth beacon placed near a DOOH ad display), RFID or NFC interactions (e.g., detecting user movement via smart shopping carts, RFID-tagged items, or NFC-enabled payment systems), computer vision tracking (e.g., analyzing in-store cameras or AI-powered sensors to estimate consumer pathing and dwell time near DOOH ads), and/or the like.

In some cases, to enhance geolocation accuracy and provide a more comprehensive understanding of user movement, the system collects additional spatial and behavioral data beyond basic location tracking. By leveraging multiple sensor inputs, movement analytics, and environmental context signals, the system refines how user presence near a DOOH ad is captured, ensuring that subsequent attribution analysis is based on detailed, high-fidelity data (as will be further described herein).

In some cases, the system performs time-spent analytics, where the system determines how long a user remained in proximity to a DOOH ad. This can be achieved by continuously monitoring a user's location pings at short intervals, assessing whether a user lingered near an ad for an extended period or simply passed by. If Bluetooth beacons or RFID tags are used, the system can record the timestamp of when a user entered and exited the beacon's detection radius, providing a precise dwell time measurement. Similarly, computer vision systems can estimate whether a consumer paused, engaged with an interactive display, or turned their body toward an ad, offering a deeper behavioral analysis beyond mere proximity.

In some cases, the system performs movement acceleration tracking, which allows the system to determine whether a user's walking speed changed near a DOOH advertisement. By using mobile device motion sensors (accelerometers, gyroscopes) or in-store tracking systems (smart shopping carts, AI-powered cameras), the system can infer whether a user slowed down, stopped, or altered their path near an ad display. A deceleration or pause event near an advertisement may indicate deliberate engagement, while a user maintaining a constant speed may suggest passive exposure.

In some cases, the system captures cross-location pathing, where a user's location history is analyzed across multiple ad environments. If a user is detected near multiple DOOH ads over time, the system logs each exposure event, creating a movement trajectory that reflects ad engagement at various locations. This is particularly useful for DOOH networks in transit hubs, shopping centers, and urban settings, where consumers may encounter an advertisement at different touchpoints throughout their journey. Cross-location tracking can be achieved through persistent MAID tracking, geofencing logs, or interactions with store-provided Wi-Fi hotspots, each offering a different layer of granularity in understanding ad exposure across locations.

In some cases, the system can analyze grouping and crowd density detection by evaluating whether multiple users were in proximity to an ad at the same time. This is done by aggregating anonymous geolocation data from multiple devices, using heatmap analysis to assess foot traffic density near DOOH screens. The system may incorporate computer vision-based crowd recognition to detect group formations, movement trends, and average dwell times per group size. By identifying high-traffic timeframes and locations where users cluster around DOOH screens, the system enhances its understanding of audience reach and potential engagement levels.

In some cases, the system applies confidence scoring to each geolocation data point to assess the reliability and precision of user location tracking. Since different location-tracking technologies provide varying levels of accuracy, the system assigns higher confidence scores to more precise sources and lower confidence scores to data sources with potential errors or signal distortions.

For example, GPS-based location tracking typically provides accurate outdoor positioning but can be less reliable indoors due to signal interference from buildings, tunnels, or multi-level structures. In contrast, Bluetooth beacons or Wi-Fi triangulation may have limited range but offer higher precision in indoor environments where GPS is unreliable.

To refine its confidence assessment, the system may cross-check multiple location signals from a user's device. If a GPS location indicates the user is near a DOOH ad, but Wi-Fi positioning places them further away, the system weights the more reliable data source higher. Additionally, the system factors in real-world conditions, such as whether the GPS data comes from a moving vehicle (indicating drive-by exposure) or a stationary device (suggesting a longer dwell time near the ad). By dynamically adjusting confidence scores based on data reliability, environmental factors, and movement patterns, the system improves the accuracy of ad exposure attribution, reducing false positives and misattributions.

Figure 3:
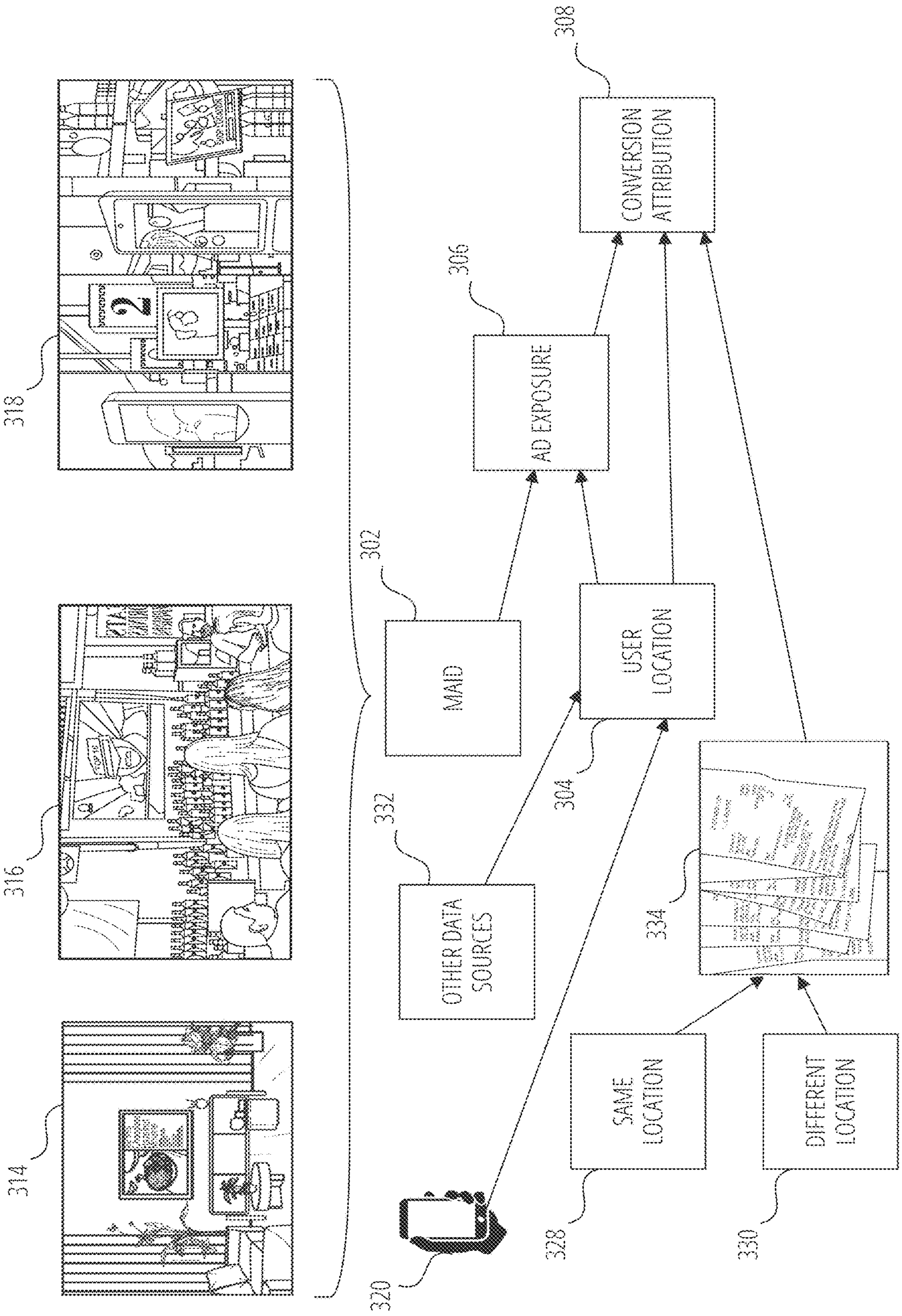
FIG. 3 illustrates an example framework for inferring consumer exposure to a digital out-of-home (DOOH) advertisement and attributing subsequent conversions using multiple data sources, including geolocation tracking, transaction data, and DOOH ad display records, according to some examples.

FIG. 3 illustrates an example framework for inferring consumer exposure to a digital out-of-home (DOOH) advertisement and attributing subsequent conversions using multiple data sources, including geolocation tracking, transaction data, and DOOH ad display records, according to some examples. The system integrates these disparate datasets to determine whether a consumer was exposed to an advertisement and whether that exposure influenced a purchasing decision. By combining real-time and historical data, the system enhances ad attribution accuracy, helping advertisers optimize future campaign strategies.

In the illustrated example, user location data is retrieved from various sources to establish whether a consumer was present within proximity of a DOOH advertisement at a relevant time. The system then cross-references ad impression data with consumer transaction records, allowing it to estimate the impact of ad exposure on purchase behavior (as will be further described herein).

As shown in FIG. 3, user location 304 can be retrieved or determined from one or more data sources to determine whether a consumer was within exposure range of a DOOH advertisement. For example, the system can receive geolocation data from a mobile device 320, which can include GPS, Wi-Fi positioning, cellular triangulation, or Bluetooth beacon detection. When a user's mobile device enters a geofenced area surrounding a DOOH display, the system records a location timestamp and associates the user's movement with the ad's display event.

Alternative location data sources 332 can supplement or replace mobile-based tracking (such as when direct device data is unavailable). These sources may include retail Wi-Fi check-ins, RFID-based movement tracking (e.g., smart shopping carts, store access points), and in-store security or AI-powered cameras capable of estimating consumer traffic flow near an advertisement. By aggregating mobile-based and non-mobile-based tracking inputs, the system strengthens its ability to determine consumer presence within a DOOH advertising zone, even when certain device-based tracking limitations (e.g., location permissions disabled) apply.

DOOH Ad Display Data

At block 204, the ad tracking system accesses DOOH ad display data. The DOOH ad display data can include a display timestamp, an identifier of the DOOH ad, and media content metadata describing a product or service featured in the DOOH ad.

The ad tracking system accesses DOOH ad impression data from an ad server. The DOOH ad impression data includes ad content items and corresponding ad entity information, specifying where, when, and how an advertisement was displayed.

The system retrieves, processes, and stores structured DOOH ad data, allowing it to establish a direct relationship between an advertisement's placement and potential consumer exposure. Instead of relying on indirect estimations, the system queries DOOH ad networks, digital signage servers, and in-store display systems to pull time-stamped and location-specific records of displayed ads. This enables high-precision correlation of ad exposures with later purchasing behavior.

DOOH ads can appear in various formats, including static and digital displays. The system captures data from physical ads, such as billboards, transit ads, printed in-store promotions, shelf talkers, and floor decals. Additionally, digital advertisements include DOOH screens, interactive kiosks, self-checkout screens, digital shelf labels, and connected TVs. In some cases, the system tracks mobile-linked ads, such as ads displayed on smart grocery carts, retailer apps, or push notifications triggered by DOOH interactions.

To ensure accurate correlation between ad exposure and consumer behavior, the system records detailed ad placement information. Ad placement information can include the physical or digital location of the ad (e.g., store aisle, checkout counter, transit hub, or mobile display), time of display (e.g., scheduled rotation intervals or continuous ad looping), campaign metadata (e.g., advertiser, product/service promoted, campaign ID), and/or the like.

The ad tracking system can ingest ad display data across different environments, including:

- Retail stores, where DOOH ads may be displayed on electronic screens, smart shopping carts, or printed promotional materials.
- Public spaces and transit hubs, where ads may be displayed on airport digital screens, subway station monitors, or roadside billboards.
- Home-based environments, where ads may appear on connected TVs, mobile devices, or smart assistants.

To provide different levels of attribution precision, the system captures DOOH ad display data at multiple granularities:

- Regional placement—The system may track ad exposure across cities, zip codes, or transit hubs.
- Store-level placement—The system identifies which store displayed the advertisement, even if aisle-level data is unavailable.
- Aisle-level placement—The system records which section of a store displayed the ad (e.g., Beverage Aisle 4).
- Shelf-level placement—The system pinpoints which shelf or product section contained the ad, improving product placement analysis.

The system can also track DOOH ads beyond store locations, ensuring that advertisements viewed in transit stations, outdoor billboards, or smart home devices can still be linked to later purchasing behavior. This multi-location DOOH tracking allows advertisers to understand how cross-channel ad exposure influences consumer decisions.

In some cases, the ad impression data includes a physical location of the ad entities where the ad content items were displayed. The ad entity information can include a location that ensures the system records precise location data for each ad, which is critical for correlating ad exposure to consumer purchases.

The location can be specific (aisle number, floor section), general (store address, mall wing, etc.), or anything in between. The system may map ad locations using retailer-provided spatial data, geofencing coordinates, or predefined shelf placement logs.

In some cases, a DOOH (Digital Out-of-Home) ad for headphones is displayed on a digital screen in an Airport, Terminal 4. The system retrieves display logs from the DOOH server, which include ad content item: a product type for the head phones, ad entity information (e.g., headphone provider, associated with a DOOH provider), location (e.g., Los Angeles Airport, Terminal 4, Gate 23 digital screen), timeframe (displayed Mar. 4, 2025, from 8:00 AM-10:00 AM), or the like.

Returning to FIG. 3, the system retrieves DOOH ad impression data from various sources, including home-based devices, in-store displays, and public viewing locations. FIG. 3 illustrates multiple DOOH ad environments, each capable of generating ad impression data, which can be linked to a Mobile Advertising Identifier (MAID) 302 for accurate exposure tracking.

In home-based environments, such as a TV 314 in the living room of a user, the system can track ad impressions using smart TV advertising networks, streaming services, and connected TV (CTV) data sources. When an advertisement is displayed on a home television, ad networks assign a unique MAID that corresponds to the device receiving the ad. This MAID allows the system to determine which household was exposed to the ad, even if multiple users reside there. If the user later makes a relevant purchase, the system correlates the CTV ad exposure with transaction data, establishing a multi-channel attribution link.

In in-store environments, such as a TV at a bar area of a store, the system can track DOOH ads displayed in retail settings where customers may be exposed while shopping, dining, or waiting in line. Unlike home-based DOOH impressions, in-store DOOH screens may rotate multiple advertisements at regular intervals. The system can retrieve ad impression logs from the in-store digital signage network, tracking:

Which ad was displayed.

Which location within the store the ad was viewed from

The time and duration of each ad display

Since physical stores often have multiple ad display zones, the system analyzes consumer location data to determine whether a user was within visibility range of an in-store ad. For instance, if a user's mobile device is detected near the bar area of a grocery store at 6:15 PM, and an ad for a new beverage was displayed on the in-store TV 316 at 6:14 PM, the system logs a high-confidence impression event.

In grocery store environments, multiple digital and static ad placements contribute to ad impression data. FIG. 3 illustrates various displays 318 throughout a grocery store, where DOOH ads may be presented on:

- Aisle-end digital displays showcasing promotional content for nearby products.
- Smart shopping carts equipped with digital screens, which dynamically adjust ads based on store location and prior engagement.
- Self-checkout kiosks, which display final-stage promotional ads before a transaction is completed.
- Shelf-mounted digital labels, which update dynamically to reflect promotions, deals, and product highlights.

Each of these DOOH ad placements generates impression data, which can be linked to user exposure through information corresponding to MAID 302. The system ingests MAID data from multiple devices (e.g., smartphones, tablets, smart shopping carts) to determine if a user was in the store during an ad display event. If the system detects a user's MAID 302 in proximity to a digital ad placement, it logs the ad impression event, allowing later correlation with transaction data.

By integrating DOOH ad impression data from home, in-store, and public viewing locations, the system provides a comprehensive attribution framework that accounts for both direct and indirect ad exposures. This ensures a more complete understanding of consumer engagement with DOOH advertising and how multi-location ad exposure contributes to purchasing decisions.

The system can receive ad information from devices that are owned by the user and not by the merchant that is selling the products or services. For example, the system can receive ad information on ads shown on a user's mobile device. This represents a mobile device exposure scenario, where the same ad is shown on a user's smartphone.

The system can receive ad information at multiple levels of granularity, allowing for different degrees of specificity in determining where an advertisement was presented within a given environment. The system retrieves and processes structured ad data that can range from broad location-based ad placements to highly specific, placements (e.g., at the bar, in the bathroom) within a store. The following describes a non-limiting list and explanation of the different granularities at which the system can receive ad information.

The system can receive regional placement ad information, enabling the system to analyze behavior for broader geographic ad distribution patterns. The regional placement can be political lines, city-level placement, zipcode or district-level ad placement, rural vs. Urban ad placement, an airport, transit hub, or travel location ad placement, a climate-based regional placement, or the like.

The system can receive store-level ad placement, where the system can receive generalized ad data indicating that an advertisement was displayed at a specific store location. For example, the ad exposure tracking system receives data stating that a soft drink advertisement was displayed at Grocery Store #152, without specifying where within the store the ad appeared.

The system can receive department-level ad placement where the system can receive information that an advertisement was displayed within a particular department of a store. For example, the system logs that an advertisement for energy drinks was displayed in the beverage section, but does not specify a particular aisle or shelf location.

The system can receive aisle-level ad placement, where the system can receive precise aisle-specific ad data, indicating that an ad was placed in a particular aisle where certain types of products are stocked. For example, an advertisement for a specific brand of cereal was displayed in Aisle 7, where breakfast cereals are located.

The system can receive shelf-level ad placement, where the system can receive detailed ad data specifying that an ad was displayed at a particular shelf location within an aisle.

For example, a digital price tag or shelf talker displayed an advertisement for organic pasta on a middle shelf in Aisle 5, alongside competing pasta brands.

The system can receive point-of-sale (checkout) ad placement, where the system can receive information that an advertisement was displayed at checkout counters or self-checkout kiosks, where last-minute purchasing decisions are made. For example, a screen at a self-checkout station displays an offer for a gum brand, which may influence impulse purchases.

The system can receive a particular area (such as a restroom, a bar, or an alley) or non-sales area ad placement where the system can receive data that an ad was displayed in non-sales areas of a retail store, such as restrooms, fitting rooms, or waiting areas. For example, an advertisement for men's grooming products was displayed in the men's restroom at a department store.

The system can receive cross-category or multi-product ad placement, where the system can receive data that an advertisement was displayed in an area that contains products from multiple categories, rather than a single product section. For example, an advertisement for a new barbecue sauce is displayed in the meat aisle, even though it is not directly sold in that section.

The system extracts itemized purchase data from receipts 334, rather than just total purchase amounts. The system does not just retrieve receipt item data but also associates each transaction with the business or merchant where the purchase occurred. This distinction is important for the system to accurately link ad impressions to purchases. For example, if a receipt lists a product purchase, but the system does not know where the purchase happened, the ad attribution logic becomes unreliable. By ensuring merchant/store-level granularity, the system can confirm whether the user was exposed to an ad at that location before purchasing the product.

Transaction Data

At block 206, the ad tracking system accesses transaction data associated with the first user. The transaction data includes records of purchasing events between the first user and one or more transaction entities related to the acquisition of goods or services. The transaction data also includes metadata about the transaction entities, such as merchant information, purchase location, and transaction timestamps.

In some cases, the DOOH exposure tracking system retrieves or receives transaction data from a point-of-sale (POS) system, payment processor, retailer database, or third-party financial data provider. The system may actively query transaction databases or passively ingest purchase data from integrated sources, such as digital wallets, mobile payment platforms, loyalty programs, banking APIs, or electronic invoice aggregators.

The transaction data can be structured as digital purchase records, stored in formats such as JSON, XML, database entries, or encrypted financial logs. These records may originate from e-receipts issued by retailers (via email, mobile apps, or digital accounts), real-time POS transaction logs stored in merchant systems, scanned physical receipts converted into structured data through optical character recognition (OCR), or transaction metadata linking purchases to specific merchants and payment methods.

The transaction data can be associated with a first user, allowing for individual-level purchase tracking. For example, the transaction data identifies items or services acquired by the first user through a transaction entity (e.g., retailer, e-commerce platform, service provider, or other commercial entity issuing receipts).

To ensure consumer-level attribution, the transaction data can be linked to an individual user identifier, such as a hashed user ID, loyalty program account, anonymized payment credential, or device-linked transaction ID. This association allows the system to perform ad correlation at the consumer level, rather than relying on aggregated transaction metrics. Moreover, by using detailed purchase data instead of generic credit card records, the system can identify specific items acquired, whereas traditional credit card transaction data would only indicate total spending at a given merchant without specifying which products or services were purchased.

The transaction data includes structured records of purchase events, allowing the system to precisely match ad exposures with user acquisitions. The transaction event data captures the details of an item or service acquired, the corresponding merchant, and the transaction timestamp.

Transaction entities may include various commercial organizations that facilitate purchases, such as grocery stores, department stores, e-commerce marketplaces, restaurants, service providers, or financial institutions processing purchase transactions.

The transaction content items refer to the goods or services acquired during a purchase event. These may include physical products (e.g., electronics, groceries, apparel), digital products (e.g., media subscriptions, software), or services (e.g., travel bookings, healthcare, entertainment). By tracking itemized purchase records, the system enables fine-grained ad attribution to determine the specific products influenced by prior ad exposures, rather than just confirming that a transaction occurred.

The transaction entity information includes metadata related to the merchant or service provider, such as store location, merchant category, store ID, branch-specific details, or platform identifiers for e-commerce transactions. For example, online retailers may include seller IDs, product listings, and regional fulfillment centers, further refining how purchase events are mapped to ad exposure history.

Returning to FIG. 3, the DOOH exposure tracking system processes transaction data to correlate it with prior DOOH ad exposures. The system aggregates transaction data from multiple sources to enable multi-touchpoint attribution modeling. For example, a consumer purchases a bottle of wine at a first grocery store. The system retrieves the corresponding transaction data, which includes:

Transaction event data (e.g., a timestamped purchase record).

Transaction content items (e.g., the wine brand, SKU, price).

Transaction entity information (e.g., merchant name: First Grocery Store, Store #152, located at 123 Main St.).

This transaction data is stored and later used to determine whether prior DOOH ad exposures influenced the purchase.

In another example, a user orders laundry detergent from an online retailer. The system retrieves the e-commerce transaction data, which includes:

Transaction event data (e.g., an online purchase, timestamped at checkout).

Transaction content items (e.g., brand, quantity, and price of detergent).

Transaction entity information (e.g., merchant name: First Online Store, Seller ID #5678).

This purchase record is stored and cross-referenced with digital ad exposures that the user encountered prior to the transaction, such as DOOH ads seen on in-store digital displays, mobile push notifications, or smart home devices.

By integrating detailed transaction data with DOOH ad exposure tracking, the system provides high-precision attribution modeling, allowing advertisers to understand the direct impact of ad campaigns on consumer purchasing behavior across various retail and digital environments.

Attribution Model for Impression

At block 208, the ad tracking system applies the geolocation data and the DOOH ad display data to a first attribution model in order to determine that the first user was exposed to the DOOH ad. The attribution model analyzes structured data inputs, such as user movement patterns, ad placement details, and timestamp alignment, to verify whether the first user was within exposure range of the DOOH advertisement in order to determine ad exposure 306.

The system establishes a computational connection between an advertisement exposure and a user's presence near the ad rather than relying on assumptions. The system applies structured attribution modeling to validate whether a consumer was likely exposed to a specific DOOH advertisement.

One of the key technical challenges in determining DOOH ad exposure is that geolocation data and DOOH ad display data originate from separate, independent systems that do not natively communicate with one another. The DOOH advertising system records when and where an ad was displayed, while the geolocation tracking system logs consumer movement patterns, but these systems typically lack a common data identifier to directly connect a user's physical presence to an ad impression event.

To overcome this challenge, the system normalizes and cross-references geolocation data with ad display metadata, applying structured attribution modeling techniques to establish whether a user was in a sufficient proximity range at the time of ad display. The system uses geofencing, timestamp alignment, movement trajectory analysis, and exposure probability scoring to determine a likelihood of ad exposure.

The DOOH exposure tracking system ingests geolocation data from a variety of sources, including mobile device location tracking (GPS, Wi-Fi positioning, cellular triangulation), in-store movement logs (smart shopping carts, RFID beacons), and external data sources such as retailer loyalty systems or payment check-ins. The also system retrieves DOOH ad display data from digital signage networks, transit advertising servers, in-store media platforms, and third-party ad reporting tools.

Since geolocation data and DOOH ad display data are recorded in different formats, the system harmonizes and maps disparate data fields to enable systematic attribution. For example, while geolocation tracking may store latitude/longitude coordinates and timestamps, DOOH ad data may log ad campaign IDs, screen placement locations, and scheduled display times. The system maps these data fields to a unified format, allowing for systematic exposure validation (as further described herein).

The system applies location-based attribution techniques to determine whether a user was within a valid exposure range of a DOOH ad. These techniques may include field of view data (e.g., within a visual range of the ad based on the placement angle and screen visibility), distance radius matching (e.g., user movement within X feet/meters of the advertisement while it was displayed), movement trajectory analysis (e.g., user walk toward, past, or pause near the ad, indicating potential engagement), and/or the like.

For example, if a user's mobile device is detected within 10 feet of a DOOH screen at 3:15 PM, and an ad for Brand X energy drink was displayed at 3:14 PM, the system assigns a high exposure confidence score. Conversely, if the user was detected 50 feet away behind an obstruction, the system assigns a lower probability that the user saw the ad.

To ensure high-precision exposure validation, the system cross-checks geolocation data with real-world context. For example, in multi-level buildings (e.g., shopping malls, transit stations, airports), GPS data alone may be insufficient, so the system integrates Wi-Fi positioning, floor plan mapping, and beacon signals to determine whether the user was on the correct floor or area where the DOOH ad was displayed.

By applying geolocation data and DOOH ad display data to an attribution model, the system provides an accurate, data-driven approach to verifying consumer ad exposure. This attribution process allows advertisers to quantify how many users actually saw an ad, rather than relying on impressions served or foot traffic estimates, leading to more precise ad performance analysis and campaign optimization.

In some implementations, the exposure attribution model assigns a confidence score to each potential exposure event. This score quantifies the likelihood that a user was actually exposed to a particular DOOH advertisement, based on features such as spatial distance from the display, dwell time near the display, direction of travel, and the timing of the display relative to the user's location data. The confidence score may be generated using a trained classifier or regression model, and may serve as an input to subsequent processing steps such as filtering, conversion modeling, or campaign scoring. For example, exposure events with confidence scores below a defined threshold may be excluded from attribution consideration or weighted less heavily during conversion modeling. This confidence-based filtering enables the system to minimize attribution noise caused by incidental user proximity to DOOH displays without meaningful ad engagement.

Conversion Attribution

At block 210, the ad tracking system applies the transaction data and the determined ad exposure event to a second correlation model in order to determine an impact score reflecting an influence of the DOOH ad to the acquisition by the first user.

The system applies an attribution model to establish relationships between DOOH ad exposures and consumer transactions. The attribution model may factor in time proximity (Was the purchase made within a time period after the ad exposure?), location proximity (Was the purchase made at or within a certain distance from the store where the DOOH ad was displayed?), cross-channel behavior (Was the consumer exposed to an ad on a digital billboard and then buy the product online?), historical consumer response patterns (Does this consumer typically respond to similar ads?), and/or multi-touchpoint engagement (Was the consumer exposed to the ad multiple times before purchasing?), as further described herein.

Returning to FIG. 3, a consumer walks into a grocery store and sees various displays 318, where they pass by a first screen displaying an advertisement for a chocolate hazelnut mousse recipe, along with an ingredient list. The consumer may also stop by a bar with a display screen (e.g., in-store TV 316) featuring the same recipe, and see the same ad on a TV 314 at home.

The system records the ad impression event, logging the advertised product, ad location, timestamp, and other relevant metadata. If the consumer purchases the mousse ingredients the following day, the system retrieves the transaction data, verifying that the consumer was exposed to the ad before making the purchase. The system correlates the ad exposure event with the transaction event and assigns a high-confidence attribution score, confirming that the advertisement likely influenced the purchase.

In some cases, the DOOH exposure tracking system applies an attribution model to link ad exposures to purchases even when transactions occur at a different time or location. Consumers may be exposed to an advertisement in one environment but delay their purchase or complete the transaction at a different store or online. The system accounts for cross-location attribution, time decay factors, and multi-channel ad reinforcement to assess the probability that an earlier ad influenced a later purchase.

Each of these DOOH ad exposures is recorded, capturing details such as the advertised product, ad placement location (e.g., Aisle 5), timestamp (e.g., 3:15 PM), and screen rotation frequency. However, instead of purchasing the ingredients immediately, the consumer leaves the store without making a purchase.

Later that evening, the consumer watches television at home, where the same mousse recipe advertisement appears on a connected TV (CTV). Additionally, the consumer may receive a mobile push notification or a social media advertisement reinforcing the same recipe. The DOOH exposure tracking system identifies that this consumer was previously exposed to the in-store ad and re-engages them with digital content to reinforce the advertising message.

If the consumer later purchases the mousse ingredients at a different store on a different day in a different location 330, the system retrieves transaction data and matches the purchase event with prior ad exposures across multiple locations and devices in order to attribute a conversion 308 (as will be further described herein).

For example, if the consumer first saw the DOOH advertisement at a first grocery store but purchased the ingredients in a second grocery store three days later, the system detects the consumer's prior presence at the first grocery store via geofencing data. The system then matches the receipt data from the second grocery store to the same product category, indicating that the advertisement may have influenced the later purchase decision.

In other cases, the user may have been exposed to an ad in one store and purchase the product in that same store at the same location 328. The system could then also identify transaction data and attribute the ad exposures to the sale of the product or good.

The DOOH exposure tracking system assigns a medium-confidence correlation score, accounting for the time delay and location shift. While there is some uncertainty, the multi-channel exposure pattern suggests that the initial in-store ad, combined with the at-home and mobile reinforcements, played a role in the purchase decision.

This multi-touch attribution framework ensures that DOOH ads are evaluated beyond immediate store-based conversions, enabling advertisers to track long-term ad influence and optimize future marketing strategies based on real-world consumer behavior pattern.

In some cases, a single attribution model can be used to both identify ad exposure and determine conversion influence. This unified approach integrates geolocation data, DOOH ad display data, and transaction records into a single predictive framework. By leveraging a multi-variable model, the system can assess the probability of exposure and conversion within the same computational process, applying a combined scoring mechanism.

This single-model approach may use deep learning, Bayesian inference, or a machine learning model to simultaneously determine whether the consumer was exposed to an ad and the likelihood that the exposure led to a purchase. Such a machine learning model can provide conversion assessments in real-time as data is received, and can reduce computational overhead by eliminating the need to pass data between multiple attribution models.

In some cases, the system may instead use two distinct attribution models, each specialized for different aspects of the correlation process. A first attribution model may focus on determining whether a consumer was likely exposed to a DOOH ad by analyzing geolocation tracking, movement patterns, and proximity scoring relative to ad display times and locations.

A second attribution model may then evaluate whether this exposure resulted in a conversion, factoring in transaction data, consumer purchase history, and external market influences. This two model approach is beneficial when greater precision is required in separating exposure from conversion events, particularly in cases where purchases occur at a later time or at a different location.

In some cases, additional attribution models can be introduced to refine exposure-to-conversion analysis further. For example, a third model may be used to factor in cross-channel behavior, evaluating how in-store exposures interact with digital retargeting ads before a purchase occurs. A fourth model may adjust attribution scores based on historical consumer trends, seasonal influences, or competing promotions.

The system may also use hierarchical or layered models, where one model predicts initial exposure, a second model refines exposure probability, and a third model attributes conversion confidence. These multi-model configurations allow the system to handle nuanced consumer behaviors and long-term attribution trends, enabling advertisers to make more data-driven ad placement and budget allocation decisions.

The system determines whether a consumer was likely exposed to a DOOH advertisement by leveraging geolocation tracking, movement patterns, and distance-based attribution techniques. By analyzing a consumer's real-world proximity to a DOOH display at the time an advertisement was shown, the system correlates ad exposure with subsequent transactions. This is accomplished by tracking the consumer's movement within a retail store, transportation hub, entertainment venue, or other commercial space, mapping their path relative to ad locations, and measuring the time and distance differences between exposure and purchase events.

The system ensures high-precision attribution of DOOH advertising impressions by focusing on proximity-based correlation. If a consumer was physically near an ad display at the time of exposure, the system assigns a higher probability that the ad influenced their subsequent behavior. To refine these probability scores, the system applies historical movement analysis, real-time geolocation validation, and time-based exposure modeling, allowing for accurate ad attribution and optimized ad placements.

When a user enters a store, transit station, stadium, or other venue, their location can be determined using multiple tracking technologies. The system may detect geofencing entry via GPS or Wi-Fi signals when a consumer arrives at a physical location where a DOOH ad is displayed. Additionally, in-store tracking methods such as RFID, Bluetooth beacons, smart shopping carts, or floor sensors may capture aisle-by-aisle movement, helping refine exposure data.

As the consumer moves through the venue, their location is logged relative to known DOOH ad placements, including shelf-mounted digital screens, large-format LED billboards, interactive kiosks, and checkout displays. The system records timestamps of movement data, creating a historical path that is later analyzed for proximity-based correlation to ad exposure events.

For example, if an ad is displayed on a DOOH screen in Aisle 5 at 3:00 PM, and a consumer's movement data places them in Aisle 5 at 3:01 PM, the system assigns a high-confidence exposure score. If the consumer then purchases the advertised product at 3:10 PM, the system establishes a proximity-based link between the DOOH ad exposure and the transaction event.

For example, the system may define an exposure threshold of 5 feet for small digital screens or 15 feet for large billboard-style displays. If a consumer passes within this range, the system assigns a higher probability score that they actually saw the ad. If a user's geolocation data places them far outside this range, the system lowers the likelihood of exposure, ensuring false attributions are minimized.

Once consumer movement data is linked to a DOOH ad placement, the system applies time-based analysis to determine whether the consumer made a purchase within a reasonable timeframe following exposure. If a purchase occurs within minutes of seeing the ad, the system assigns a high-confidence attribution score. If the purchase occurs hours or days later, the system evaluates historical shopping behaviors to determine whether the ad still significantly influenced the decision. If the consumer saw the ad in-store but later received a mobile or CTV retargeting ad, the system weights the influence of each exposure event accordingly.

Beyond real-time movement tracking, the system can also analyze historical consumer movement behaviors to refine attribution models. If a consumer frequently visits the same store, transit station, or entertainment venue, the system can determine whether their behavior is habitual or ad-driven. If a consumer normally shops in one store section but suddenly moves into an aisle with an ad display, the system increases the probability that the ad influenced their decision. If a consumer enters a location, pauses near a DOOH ad, and then leaves without making a purchase, the system flags this event for potential retargeting via mobile ads or CTV campaigns.

For example, if historical movement data shows that shoppers take an average of 10 minutes to check out after passing an ad, but a specific consumer took 45 minutes before purchasing the product, the system adjusts the probability score to account for past shopper behavior trends.

By cross-referencing multiple tracking sources, the system strengthens attribution models and minimizes uncertainty, ensuring that DOOH ad exposure events are accurately linked to consumer behaviors and purchase decisions.

Multiple Touch Point Exposure and Attribution

A consumer's path to purchase is often influenced by multiple advertising touchpoints across different channels, locations, and devices. However, traditional ad tracking systems lack the capability to correlate impressions across various channels and link them to an actual sale, especially when the purchase occurs days or weeks later at a different location than the original ad exposure.

The DOOH exposure tracking system is designed to detect and track ad exposures across multiple DOOH mediums and digital engagement channels, including DOOH screens, mobile ads, connected TV (CTV) ads, social media promotions, and in-store advertisements. The system correlates such impressions with actual conversions using transaction data, ensuring that multi-touchpoint interactions are properly attributed.

By integrating geofencing data, historical purchase behaviors, and mobile engagement signals, the system creates a multi-channel attribution model that assigns different weightings to each advertising touchpoint, determining which exposure was most influential in driving a purchase decision.

The system detects consumer interactions with DOOH advertisements across various sources, including in-store DOOH advertisements (e.g., consumers may be exposed to ads via digital signage, aisle-end displays, self-checkout screens, digital shelf tags, or smart shopping cart screens while shopping in a physical retail store), retailer mobile apps (e.g., if the consumer has a store loyalty app or a retailer's shopping app installed, they may receive personalized promotions, mobile-exclusive discounts, or in-app product recommendations reinforcing the DOOH messaging seen in-store), social media advertisements (e.g., the system tracks whether a consumer who engaged with an in-store DOOH ad is later shown a social media advertisement for the same product on platforms), mobile push notifications (e.g., a consumer who viewed an ad on a DOOH screen in-store may later receive a push notification reminding them of the advertised product or offering an additional incentive such as a discount or promotional offer to encourage a purchase), email campaigns and loyalty program notifications (e.g., the system monitors whether the consumer receives a follow-up email or app notification for a product they were previously exposed to through DOOH advertising), connected TV (CTV) ads and streaming services (e.g., a consumer who saw a DOOH ad in-store may later be exposed to a related advertisement while watching TV at home via streaming platforms, CTV ad placements, or digital programmatic ads, reinforcing the DOOH message), and/or the like.

By tracking engagement across multiple sources, the system provides a comprehensive view of the consumer's journey, allowing for more accurate ad performance measurement and campaign optimization based on real consumer interactions.

After detecting ad exposures across multiple touchpoints, the system evaluates how each touchpoint contributed to the final purchase decision. The system can apply one or more attribution factors to weigh each interaction based on exposure frequency, timing, and relevance to the purchase event.

The attribution model can apply aggregated attribution scoring. For example, if a consumer sees multiple DOOH ads for the same product across different channels (e.g., a DOOH screen in-store, a mobile notification, and a streaming TV ad), the system calculates an aggregated attribution score to determine the overall influence of these exposures on the purchase decision.

The attribution model can apply time-decay attribution modeling. For example, the system assigns greater influence weighting to ads that appeared closer to the time of purchase. If an in-store DOOH ad was displayed a week before purchase, but a mobile ad was displayed the day before the purchase, the mobile ad receives a higher attribution score due to recency of exposure.

The attribution model can apply weighted influence of each touchpoint. For example, if an in-store DOOH ad initially captured consumer interest, but a mobile push notification triggered the final purchase decision, the system assigns a greater attribution weight to the mobile ad for driving conversion, while still crediting the initial in-store DOOH exposure for initiating awareness.

As an example of multi-touchpoint DOOH exposure and attribution, a consumer sees a cereal advertisement on an in-store digital screen, later receives a mobile push notification reminding them of the product, and finally sees a related ad while streaming content at home. The system compiles all these touchpoints into an aggregated attribution model. If the consumer purchases the cereal the next day, the system assigns a percentage contribution to each touchpoint, identifying the most influential ad exposure in driving the final conversion.

As another example of multi-touch DOOH exposure and purchase correlation, the consumer sees an in-store digital screen ad for a protein shake while shopping at a grocery store. Later that night, they receive a mobile push notification reminding them about the protein shake promotion. Two days later, they see a CTV advertisement for the same protein shake while watching a fitness video at home. The next day, the consumer purchases the protein shake at a different grocery store.

The DOOH exposure tracking system correlates all three ad exposures, determining that multi-touchpoint ad reinforcement contributed to the final purchase decision. The system calculates an attribution score, factoring in cross-channel ad influence, time delays, and behavioral engagement patterns, ensuring that advertisers can quantify the effectiveness of their DOOH campaigns across multiple consumer interactions.

Ad Exposure Levels

The DOOH exposure tracking system captures ad exposure data at various levels, allowing for a highly detailed analysis of consumer interactions with advertisements. By recording ad placement data at different resolutions—ranging from broad regional-level exposure to highly specific display-level placements—the system enables precise attribution modeling. This multi-level tracking approach ensures that advertisers can optimize ad placements based on actual consumer engagement, refining marketing strategies for maximum impact.

The system can track DOOH advertisements displayed across an entire commercial venue, without specifying a particular viewing area. This applies to mall-wide promotions, digital billboards, transit advertising screens, checkout counter displays, and entrance-based advertisements, which are generally visible to all consumers passing through the location.

For example, if a DOOH ad for a new energy drink is displayed on a large digital screen at the entrance of a shopping mall, the system records this as a venue-level exposure event. Any consumer who later purchases the advertised product, either at a store within the mall or at a different location, may be linked to this broad ad exposure. While venue-level exposure provides widespread marketing reach, it does not distinguish between specific consumer behaviors within the venue, making it less precise for direct attribution modeling.

At a section level, the system can track ads displayed in specific store areas, such as grocery aisles, electronics sections, or seating areas within an airport terminal. This enables more targeted attribution models, allowing the system to correlate ad exposure with purchasing activity within specific store zones.

For example, if an advertisement is placed in Aisle 7 (Cereal Section) of a grocery store, the system ensures that only consumers who visited Aisle 7 are considered for potential ad impressions. This prevents overgeneralizing exposure and improves ad relevance tracking. If a shopper walks through Aisle 7 and later purchases a promoted cereal brand, the system assigns a higher confidence score to the correlation between the aisle-level ad and the purchase event. Conversely, if a consumer enters the store but does not visit Aisle 7, the system excludes that shopper from attribution calculations, improving accuracy in measuring ad impact.

At a geographic level, the system can track DOOH ad exposure at the zip code, district, or city level, allowing advertisers to analyze how regional factors influence purchasing behavior. Advertisers may run localized promotions, where specific ads are only displayed in certain neighborhoods or store chains within a region.

For example, a seasonal DOOH campaign for barbecue sauces may be more effective in Southern states, where grilling is more common. The system collects DOOH ad exposure data for specific zip codes where the ads were shown and correlates them with transaction data to analyze regional purchase trends. This level of location-based attribution helps advertisers refine marketing efforts based on regional consumer behaviors.

At the most detailed level, the system can detect precisely where an ad was displayed within a specific section or aisle and whether it was placed near related or complementary products. This allows the system to analyze the impact of ad placement on consumer decision-making.

For instance, if an advertisement for pasta sauce is placed in the pasta aisle, the system not only records the aisle location but also detects whether the ad was positioned near competing brands or complementary products like pasta noodles. If a consumer buys both pasta sauce and noodles, the system may assign a higher likelihood that the ad influenced their bundled purchase decision.

Additionally, ads placed in non-traditional locations—such as restrooms, checkout lanes, or seating areas within retail stores—can be tracked separately. If a sports drink ad is displayed in a gym locker room or near a vending machine, the system analyzes whether location-based advertising results in higher conversion rates compared to traditional aisle placements.

By supporting multiple levels of ad exposure tracking, the system provides a highly flexible and detailed framework for measuring DOOH ad effectiveness. From broad regional campaigns to highly targeted section-level placements, the system captures and normalizes ad placement data across various real-world environments. This enables advertisers to dynamically adjust marketing strategies, ensuring stronger campaign performance, improved ad placement efficiency, and more accurate consumer attribution modeling.

The level of ad exposure can affect both exposure confidence and conversion likelihood. More granular ad placement data allows for higher attribution accuracy, as it reduces uncertainty in whether a consumer was actually exposed to an ad. For instance, if the system identifies that a consumer was in Aisle 7 of a grocery store at the same time that a DOOH ad for cereal was displayed on an in-aisle screen, the system can assign a high-confidence correlation score to this exposure event. This is because the consumer's physical proximity to the ad location increases the probability that they saw and engaged with the advertisement.

In contrast, if the system only knows that a DOOH ad for cereal was displayed somewhere in the store, and the consumer was in the store but without aisle-level tracking, the exposure certainty is lower since the consumer may not have passed by the ad location.

This level-based differentiation also impacts conversion attribution models. When ad exposure is recorded at a general store level, the system can still make broad correlations between ad impressions and purchases, but these correlations carry a lower weight due to higher uncertainty.

Conversely, when the ad location is known with aisle- or shelf-level precision, and the consumer's movement data confirms they were within that specific section, the system applies a stronger correlation weight, leading to more reliable conversion tracking. Additionally, if an ad was displayed on a smart grocery cart screen that was actively used by the consumer, the system can assign an even greater attribution confidence score, as the consumer directly interacted with the ad display medium.

By leveraging different levels of ad exposure tracking, the system optimizes ad attribution weighting, ensuring that granular ad placements receive stronger correlation scores, while higher-level exposures retain flexibility in broader campaign analysis. This dynamic approach enables advertisers to adjust campaign strategies, favoring high-accuracy attribution methods for aisle-specific and interactive ad placements, while still gaining valuable insights from store-wide, regional, or venue-based ad exposures.

Optimizing Ad Campaigns Based on Correlation with Transaction Data

At block 212, the ad tracking system adjusts an ad campaign based on the correlation between the ad exposure event and the transaction data. By analyzing purchase behaviors linked to specific ad impressions, the system provides actionable insights that optimize future advertising strategies, helping advertisers maximize their return on investment. The system evaluates which ads are driving consumer purchases, identifies ineffective placements, and refines targeting strategies to improve conversion rates.

Figure 4:
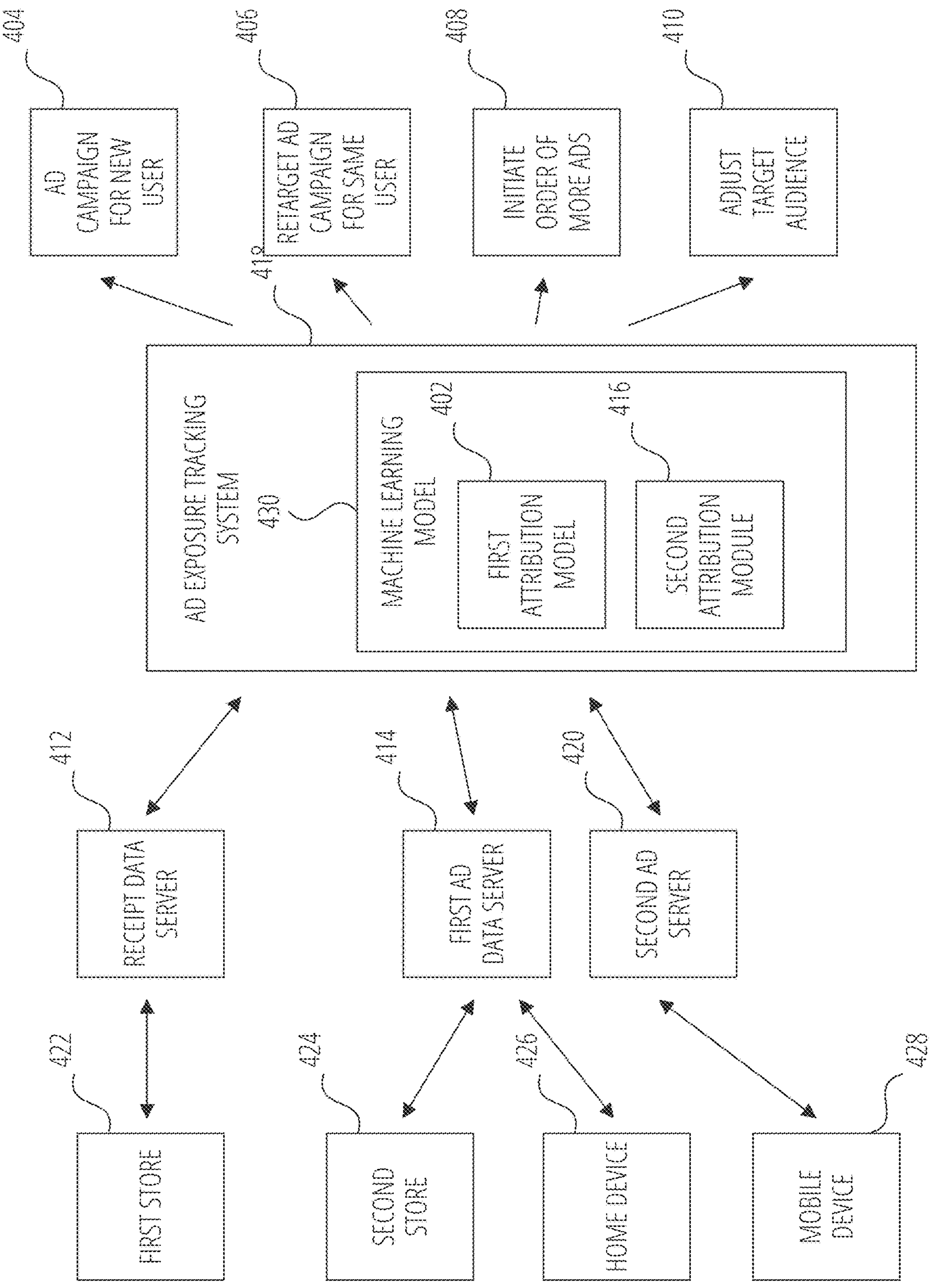
FIG. 4 illustrates actionable insights for the system based on correlations made with receipt data, according to some examples.

FIG. 4 illustrates the process by which the system gathers and processes multi-source ad and transaction data to derive actionable marketing insights. The system ingests data from various sources, including DOOH ad servers, geolocation tracking, and mobile engagement records, normalizing them through the ad exposure tracking system 418. A first attribution model 402 and a second attribution model 416 analyze these data points to identify which advertising strategies effectively influence consumer behavior. Additionally, a machine learning model 430 continuously refines these insights by identifying new patterns in advertising effectiveness and consumer purchase behaviors.

The first store 422 represents a physical retail location where consumers are exposed to in-store ads. These ads may be DOOH digital signage, interactive kiosks, or print advertisements such as floor decals, shelf talkers, and checkout counter displays. Purchases made at this location are captured by the first receipt data server 412, which stores structured transaction records. However, this receipt data may exist in a separate system from ad servers, requiring the ad exposure tracking system 418 to process and correlate multi-source data.

In some embodiments, the receipt data server 412 may include receipt data, such as digital or image-based records of product purchases submitted through consumer-facing applications. However, receipt data server 412 is not limited to receipts. The receipt data server 412 can include other types of consumer-product engagement signals that reflect direct or indirect interactions with a merchant or brand.

For example, the receipt data server 412 may comprise digital order confirmations received via email or app, loyalty program logs showing in-store check-ins or reward redemptions, QR code scans for promotional items, barcode scans through shopping apps, or itemized transaction summaries from online e-commerce platforms. In some cases, the receipt data server 412 may include inferred purchases from geolocation-triggered store visits, mobile app-based product browsing behavior, or linked digital wallet activities.

In some embodiments, the transaction log data may include credit card history data, such as itemized or non-itemized transaction records obtained from financial institutions, card networks, or bank account aggregators. Transaction log data is not limited to traditional credit card statements.

Transaction log data may include debit card records, buy-now-pay-later (BNPL) payment activity, mobile wallet transactions, or direct bank transfers associated with point-of-sale systems. In some cases, transaction log data may include anonymized summaries of consumer-level financial activity derived from financial APIs or banking data platforms.

In some embodiments, the transaction instrument comprises a credit card used by the user to complete a transaction, and credit card records are accessed from financial systems or banking APIs. However, the transaction instrument is not limited to credit cards. A transaction instrument may include other forms of payment methods such as debit cards, store-branded loyalty cards, digital payment accounts, mobile wallets, or payment tokens used in encrypted or anonymized environments. In some cases, the transaction instrument may represent a bank account number used for ACH or direct deposit payments, or a virtual card issued for one-time purchases.

The second store 424 functions similarly, capturing ad exposures at a separate retail location, while home device 426 represents at-home ad exposures, such as CTV (Connected TV) ads, streaming service banners, or smart speaker promotions. Unlike the first store, these devices do not directly communicate with a receipt data server. Instead, they log ad impression data in the first ad data server 414, which tracks digital and physical ad placements across multiple venues.

The first ad data server 414 processes exposure logs from various ad sources, such as store-based DOOH screens (e.g., grocery aisle digital signage) and out-of-home digital ads displayed at home or in transit (e.g., CTV ads, billboards, or airport screens). This server transmits structured ad exposure data to the ad exposure tracking system 418, which then correlates ad exposures with transactions recorded in receipt data servers.

The mobile device 428 enables on-the-go advertising touchpoints, including retailer app notifications, personalized discounts, and social media promotions. Mobile devices introduce a unique level of ad tracking, capturing real-time user location data and behavioral engagement metrics. The second ad data server 420 logs and processes mobile ad exposure interactions, such as push notification clicks, social media ad engagements, and search engine ad views. This data is then cross-referenced with receipt data and other ad exposure records to build comprehensive multi-touch attribution models.

Once the system successfully correlates ad exposures with consumer purchases, it generates insights that allow advertisers to adjust campaigns dynamically. The system identifies which ad placements drive the most conversions, enabling advertisers to increase investments in effective advertising locations. If a DOOH digital display in Aisle 7 consistently correlates with high conversion rates for cereal purchases, the system flags this location as a high-performing ad placement.

Based on this insight, advertisers can increase exposure in this area, such as by expanding the number of in-store digital screens showing the ad, increasing ad frequency at high-performing locations, negotiating for premium ad placement at the most influential store sections, or enhancing promotional strategies based on high-engagement zones. For example, if checkout lane DOOH ads promoting impulse purchase items show higher conversion rates than in-aisle signage, the system recommends reallocating ad spend toward checkout-based promotions.

The system also detects ad placements that fail to drive purchases, enabling advertisers to adjust ineffective strategies. If an ad for a sports drink placed in the frozen food aisle shows low correlation with transactions, the system may suggest moving the ad to the beverage section or checkout aisle. Similarly, if mobile push notifications promoting a product fail to generate significant sales uplift, the system may recommend switching to CTV ads or in-store displays for better engagement.

The system suggests corrective actions such as relocating underperforming ads to higher-traffic store zones, switching static ads to interactive digital formats, and refining ad content by adjusting messaging, imagery, or promotional offers. For example, if an ad for a premium brand of pasta sauce placed in the household goods aisle shows low conversions, the system may recommend moving them to the pasta and sauce aisle to increase purchase likelihood.

Not all consumers purchase a product immediately after viewing an ad, but they may still be influenced by multi-touch ad strategies. The system identifies consumers who were exposed to an advertisement but did not complete a purchase and re-engages them through personalized follow-ups via mobile push notifications, CTV and streaming ads reinforcing the product message, loyalty app recommendations, or social media retargeting based on past ad engagements.

For example, if a consumer saw an in-store digital screen ad for a frozen pizza but didn't buy it, the system may later serve them a CTV ad for the same product while they stream a food-related show. If CTV ads tend to generate higher conversion rates, the system prioritizes more at-home ad placements to reinforce in-store exposures.

Using real-time conversion data, the system dynamically adjusts ad placements and orders additional inventory of successful campaigns. The system can increase ad frequency at top-performing locations, trigger additional orders for successful DOOH campaigns, adjust bidding strategies for digital ad placements, and refine audience targeting based on past engagement data.

For example, if an in-store DOOH ad for a protein bar achieves a high conversion rate, the system may automatically increase bids for related digital ads in fitness apps or food delivery platforms. Similarly, if DOOH ads at gas stations lead to increased impulse purchases of energy drinks, the system can recommend placing additional ads at similar high-traffic locations.

The system also enables advertisers to segment consumers based on their ad engagement behaviors and purchase patterns, ensuring more tailored ad targeting. It identifies segments such as ad-sensitive buyers (e.g., consumers who frequently purchase products shortly after ad exposure), delayed converters (e.g., consumers who require multiple ad touchpoints before making a purchase), cross-store buyers (e.g., consumers who see an ad at one store but buy at another), and category-driven buyers (e.g., consumers who purchase products from the same category), even if they switch brands. These insights enable personalized marketing strategies, such as targeting delayed converters with time-sensitive offers, adjusting messaging for ad-sensitive buyers to encourage repeat purchases, and increasing cross-store promotions for consumers who engage across multiple retail locations.

By leveraging DOOH ad exposure data, transaction records, and AI-driven attribution models, the system provides a comprehensive framework for optimizing ad performance. It ensures that high-performing ads receive more exposure, underperforming ads are refined, and potential consumers are re-engaged through multi-touchpoint advertising strategies. These automated insights enable dynamic ad adjustments, maximizing advertising efficiency and return on investment across physical, digital, and mobile advertising channels.

The system can initiate an advertising campaign targeted at new users 404 who have not previously engaged with the advertised product or service. By analyzing behavioral trends, demographic data, and purchase history of similar consumers, the system identifies potential new customers and displays ads through relevant channels, such as in-store displays, mobile notifications, or digital platforms. These campaigns focus on generating initial awareness and encouraging first-time purchases by tailoring ad messaging and incentives based on predictive modeling. The ad impression and exposure factors identified herein can be used to identify ads for new users and target audiences.

If a user has previously been exposed to an advertisement but has not yet completed a purchase, the system can initiate a retargeting campaign 406 to reinforce the marketing message. The system identifies consumers who have interacted with an ad—whether through in-store exposure, online engagement, or mobile notifications—but have not yet converted. It then serves follow-up ads across multiple touchpoints, such as social media, Connected TV (CTV), or personalized mobile promotions. The retargeting strategy may include discounts, reminders, or additional product information designed to increase the likelihood of conversion.

Based on attribution data, the system can automatically place orders 408 for additional ad placements in high-performing locations. If a specific ad campaign demonstrates a strong correlation with increased transactions, the system recommends increasing the frequency of ad displays in those locations or expanding the campaign to additional markets. This process ensures that successful advertisements receive greater visibility, maximizing their impact while avoiding wasteful spending on low-performing placements.

The system can refine ad targeting 410 based on audience purchase behaviors and observed conversion patterns. By analyzing the correlation between ad exposures and actual purchases, the system dynamically adjusts ad content, placement, and frequency to align with consumer preferences. For example, if a particular demographic group responds favorably to a specific product ad, the system increases ad exposure for that group while reallocating budget away from less responsive audiences. Additionally, purchase timing and seasonal trends are factored into campaign adjustments to ensure optimal ad delivery for maximum conversion efficiency.

In some implementations, the system may incorporate a feedback mechanism to update or retrain one or more of the models shown in FIG. 2. For instance, the media content campaign system may track downstream metrics such as conversion performance, user engagement, or campaign ROI, and provide those outcomes as input to refine the models 208, 210, or 212. This feedback loop may operate periodically or continuously, allowing the system to adapt to evolving consumer behaviors, seasonal trends, or changes in advertising strategy. Retraining may be triggered automatically based on drift detection or performed manually in response to performance audits. By learning from real-world campaign effectiveness data, the system improves its exposure and conversion predictions over time and enhances the quality of its future campaign recommendations.

Machine Learning-Based Ad Exposure and Purchase Attribution

Traditional ad tracking systems and receipt-based transaction systems operate independently, making it difficult to establish direct correlations between ad exposures and consumer purchases. A consumer may view a DOOH advertisement in one location, encounter additional ads online or on mobile devices, and then complete the purchase elsewhere or at a later time. Without a robust correlation method, rule-based attribution systems struggle to detect meaningful relationships between ad impressions and purchase behaviors.

To address this challenge, the system applies a machine learning model (e.g., the second attribution model 416) that enhances ad exposure-to-purchase attribution by filtering out noise, reducing false positives, compensating for missing or incomplete data, assigning confidence scores to correlation events, and predicting future purchasing behavior based on historical trends. By continuously refining attribution accuracy, the system ensures that advertisers can reliably determine which DOOH advertisements contribute to conversions and optimize their campaigns accordingly.

Not all ad exposures result in purchases, and some transactions may appear correlated purely due to chance. External factors such as in-store promotions, seasonal trends, and product pricing can influence purchase behavior independently of an advertisement. To mitigate false correlations, the system applies machine learning algorithms that detect meaningful relationships while filtering out transactions that are coincidental or unrelated to advertising efforts.

The machine learning model is trained on large-scale transaction data to establish baseline purchasing behaviors. When an ad is displayed at 3:00 PM and a consumer purchases the product at 3:05 PM, the system evaluates whether this timing is statistically significant or if similar purchases frequently occur without ad exposure. If the purchase rate remains constant regardless of ad impressions, the system assigns a lower correlation confidence score. However, if the purchase rate increases notably after exposure, the system confirms a stronger causal relationship and elevates the attribution score.

In some cases, direct product matches may be unavailable in transaction data. For example, a consumer may see an ad for Brand X soda but choose to purchase a different brand of soda, or a consumer may see an ad in Store A but later purchase the product at Store B. The machine learning model estimates purchase influence likelihood even in such scenarios by examining historical shopping patterns to determine whether ad-exposed consumers tend to buy related products later.

For instance, if an ad for granola bars is shown, and the consumer instead purchases cereal, the model identifies historical substitution trends and determines whether the advertisement still contributed to the consumer's purchase decision. The system compares the purchase behaviors of ad-exposed consumers versus non-exposed consumers to estimate ad impact, even when exact product matches are missing from the receipt data.

The machine learning model assigns confidence scores to each correlation event by evaluating various factors, including time difference (how soon after the ad exposure the consumer made a purchase), location proximity (whether the purchase was made at the same store where the ad was displayed), product match strength (whether the consumer bought the exact advertised product, a similar product, or a substitute), and consumer behavior trends (whether the purchase was habitual or influenced by the advertisement).

Unlike rule-based attribution models, which rely on static predefined conditions, machine learning-based attribution continuously improves by training on past transaction data to recognize complex ad-consumer interactions. Additionally, the model can be retrained periodically to account for new purchase trends, evolving consumer interests, and corrections based on updated transaction data.

To automate large-scale ad attribution, the system applies machine learning classifiers that categorize consumer transactions based on their likelihood of being ad-driven. Instead of relying on hardcoded rules, these classifiers learn from historical ad exposure and purchase datasets to identify statistical patterns that predict consumer responsiveness to ads.

Supervised learning techniques train the classifiers using labeled datasets, where past ad exposures are marked as resulting in a purchase (positive outcome) or not leading to a purchase (negative outcome). Over time, the system refines its ability to distinguish between genuine ad-driven conversions and incidental transactions.

Several classifier types can be used to analyze consumer behavior and optimize ad effectiveness. Decision trees use a hierarchical structure to classify purchases based on features like time between exposure and transaction, store visit frequency, and past consumer behavior. Support Vector Machines (SVMs) handle complex, non-linear relationships between ad exposure and purchasing behavior, allowing them to detect indirect influences of advertising, such as a consumer who sees an ad but buys a competing brand. By deploying these classifiers, the system ensures that ad investments are focused on high-impact campaigns while filtering out low-value ad exposures that do not contribute to conversions.

The machine learning model analyzes various behavioral signals to determine whether a purchase was influenced by an ad, including past purchase behavior (whether the consumer has bought this product before without seeing an ad), in-store movement data (whether the consumer paused near an ad display or walked past without stopping), multi-touch attribution weighting (whether the consumer saw multiple reinforcing ads across different channels), geolocation and path analysis (whether the consumer entered an aisle with an ad and later purchased that product), and competitor and cross-store influence (whether the consumer saw an ad for Brand A in Store X but purchased Brand B in Store Y). By analyzing these key purchase drivers, the system ensures that advertisers optimize marketing strategies, refine audience targeting, and improve campaign efficiency.

The machine learning model is trained on large-scale datasets containing historical ad exposures, consumer movement patterns, and transaction data. The training process involves data collection and preprocessing, where raw data from ad servers, electronic receipts, geofencing logs, and loyalty programs is aggregated, cleaned, and normalized. Since data from ad impressions and purchase logs originate from separate, non-communicating systems, normalization techniques are applied to align different data formats, ensuring the model can correctly interpret and correlate the data.

Once the data is cleaned, the system performs feature engineering, selecting key variables that influence ad effectiveness. These features may include time spent near an advertisement, frequency of ad exposure, type of ad format (in-store, mobile, or digital), store location, past purchasing behavior, and external influences such as competing promotions or seasonal trends. The model is then trained to identify patterns that distinguish ad-influenced purchases from organic buying behavior.

The training phase uses supervised learning techniques, where the model is provided with labeled training data—examples of past ad impressions paired with purchase outcomes. During this phase, backpropagation and gradient descent optimization techniques adjust the model's parameters to minimize prediction errors, allowing it to generalize effectively to unseen data.

Once the initial training is complete, the model undergoes evaluation and fine-tuning using a validation dataset to assess accuracy, recall, and precision in classifying ad-driven versus independent purchases. Techniques such as cross-validation, hyperparameter tuning, and reinforcement learning feedback loops are applied to optimize performance. The system continuously refines its predictions by incorporating new consumer transaction data and real-time advertising interactions, ensuring the model remains adaptive to changing consumer behaviors and emerging ad strategies.

After deployment, the model is monitored for drift detection and recalibration to ensure accuracy over time. If consumer habits shift, ad effectiveness declines, or external factors influence buying behavior, the model retrains itself using continuous learning pipelines. By leveraging these training methodologies, the system ensures that advertisers receive real-time, data-driven insights into ad effectiveness, enabling them to allocate budgets efficiently and maximize campaign impact.

In some cases, the system retrains the machine learning model to ensure continued accuracy and reliability in predicting ad effectiveness. Over time, consumer behaviors, market trends, ad formats, and purchasing patterns evolve, requiring the model to adjust to new data distributions. To maintain high prediction accuracy, the system periodically retrains the model using the latest ad exposure data, transaction records, and external influencing factors such as price fluctuations, seasonal shopping trends, and competitor promotions.

Retraining follows a continuous learning pipeline, where new data is periodically fed back into the model, and performance is evaluated against real-world consumer interactions. The system monitors how well the model's predictions align with actual purchasing behavior and automatically triggers retraining when performance metrics such as precision, recall, and F1-score begin to degrade. During retraining, the model incorporates new consumer movement patterns, cross-store purchasing habits, and updated product-category preferences, allowing it to refine its attribution logic. This iterative process helps reduce model bias, prevent overfitting to outdated trends, and improve generalization to new advertising environments.

By incorporating an adaptive retraining strategy, the system ensures that the ad attribution model remains highly responsive to new trends, resilient to market fluctuations, and capable of delivering precise, real-time advertising insights.

Although certain features described herein are attributed to being performed by a machine learning model, this is done for brevity and clarity. It is appreciated that any one or more of these features can alternatively be performed using other computational methods, including rule-based algorithms, heuristic models, statistical inference techniques, or a combination thereof. For example, while a machine learning model may be used to determine ad exposure probabilities or attribution scores, similar functionality could also be achieved through predefined threshold rules, probabilistic scoring methods, or deterministic logic based on structured data correlations. Accordingly, references to machine learning implementations should be understood as exemplary rather than limiting, and the system may employ various computational techniques depending on efficiency, accuracy, and implementation constraints.

Ad Exposure and Conversion Tracking Across Multiple Locations

Figure 5:
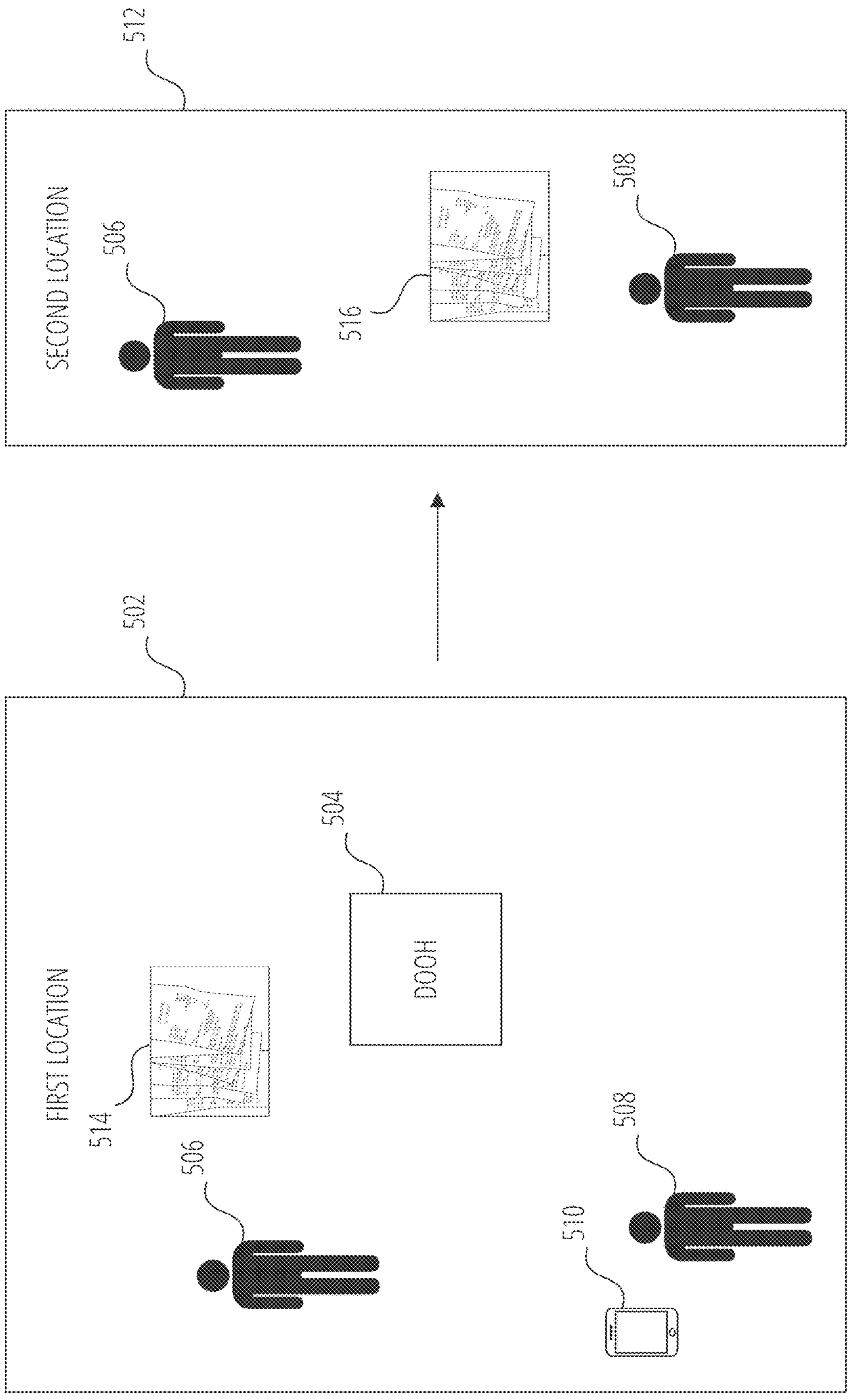
FIG. 5 illustrates how the system determines ad exposure and tracks conversions across multiple locations using DOOH advertisements, consumer movement data, and transaction records, according to some examples.

FIG. 5 illustrates how the system determines ad exposure and tracks conversions across multiple locations using DOOH advertisements, consumer movement data, and transaction records, according to some examples.

In this example, a first location 502 contains a DOOH display 504 where a first user 506 and a second user 508 are both present. The system can use one or more ways to determine whether these users were likely exposed to the DOOH advertisement.

For example, the system can analyze receipt data 514 associated with the first user, indicating that the user made a purchase at the first location, which serves as confirmation that the user was physically present near the DOOH screen. Second, the system can leverage mobile device 510 tracking, including GPS-based geofencing, Wi-Fi triangulation, or Bluetooth beacon signals, to verify that both the first and second users were within viewing range of the advertisement when it was displayed.

After the system confirms ad exposure, the system can determine whether a conversion event occurred. If the first user 506 purchases the advertised product at the first location 502, the system captures this transaction via receipt data 514. The system then correlates this purchase with the prior ad exposure event at the same location, linking the DOOH advertisement to a direct in-store conversion. This attribution model assigns a confidence score to the correlation, considering factors such as the time elapsed between exposure and purchase, the exact product match, and historical consumer purchasing behaviors.

Alternatively, the system can track conversions that occur at a second location 512. Even if the first user 506 or the second user 508 do not immediately purchase the advertised product at the first location 502, the system monitors subsequent purchases. If either user later buys the advertised product at the second location 512, the system detects this through receipt data 516. In this case, the system attributes the conversion to the initial ad exposure at the first location 502, accounting for delayed purchasing behavior and cross-location influence.

The system enables comprehensive multi-touch attribution, ensuring that conversions are not solely attributed to in-store purchases at the original exposure site. By tracking purchases across different locations, the system provides deeper insights into how DOOH advertisements influence buying decisions over time and space. Additionally, by leveraging both receipt-based purchase confirmation and mobile geolocation tracking, the system enhances the accuracy of exposure validation, minimizing reliance on estimations and maximizing confidence in attribution outcomes.

Machine Architecture

Figure 6:
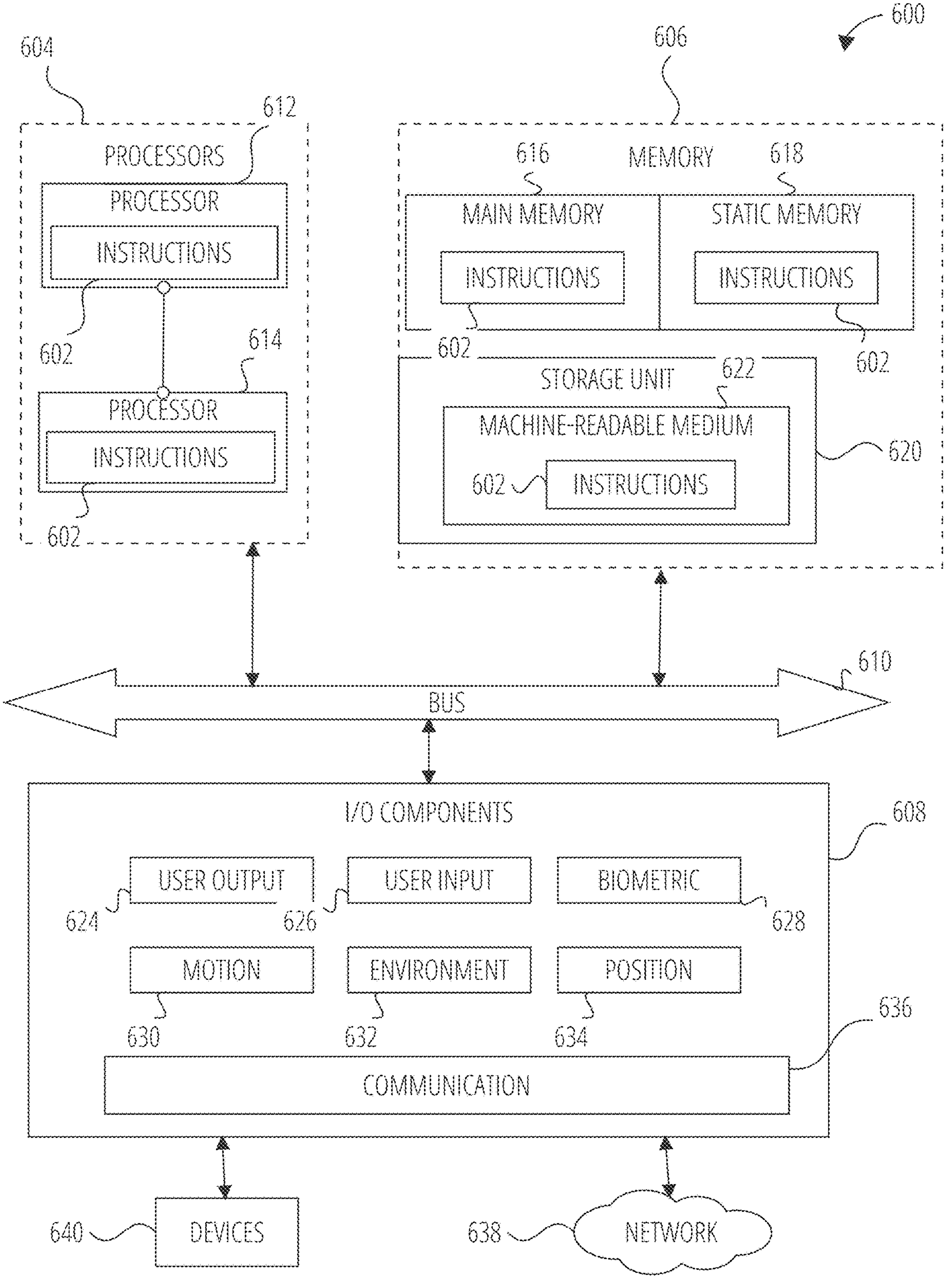
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise a user system or any one of multiple server devices forming part of the server system. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include medical device components, motion components 630, environmental components 632, or position components 634, among a wide array of other components. For example, the medical device components 628 include components to detect data from medical devices, as further described herein.

The motion components 630 include acceleration sensor components (e.g., accelerometer), gravitation sensor components, rotation sensor components (e.g., gyroscope).

The environmental components 632 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
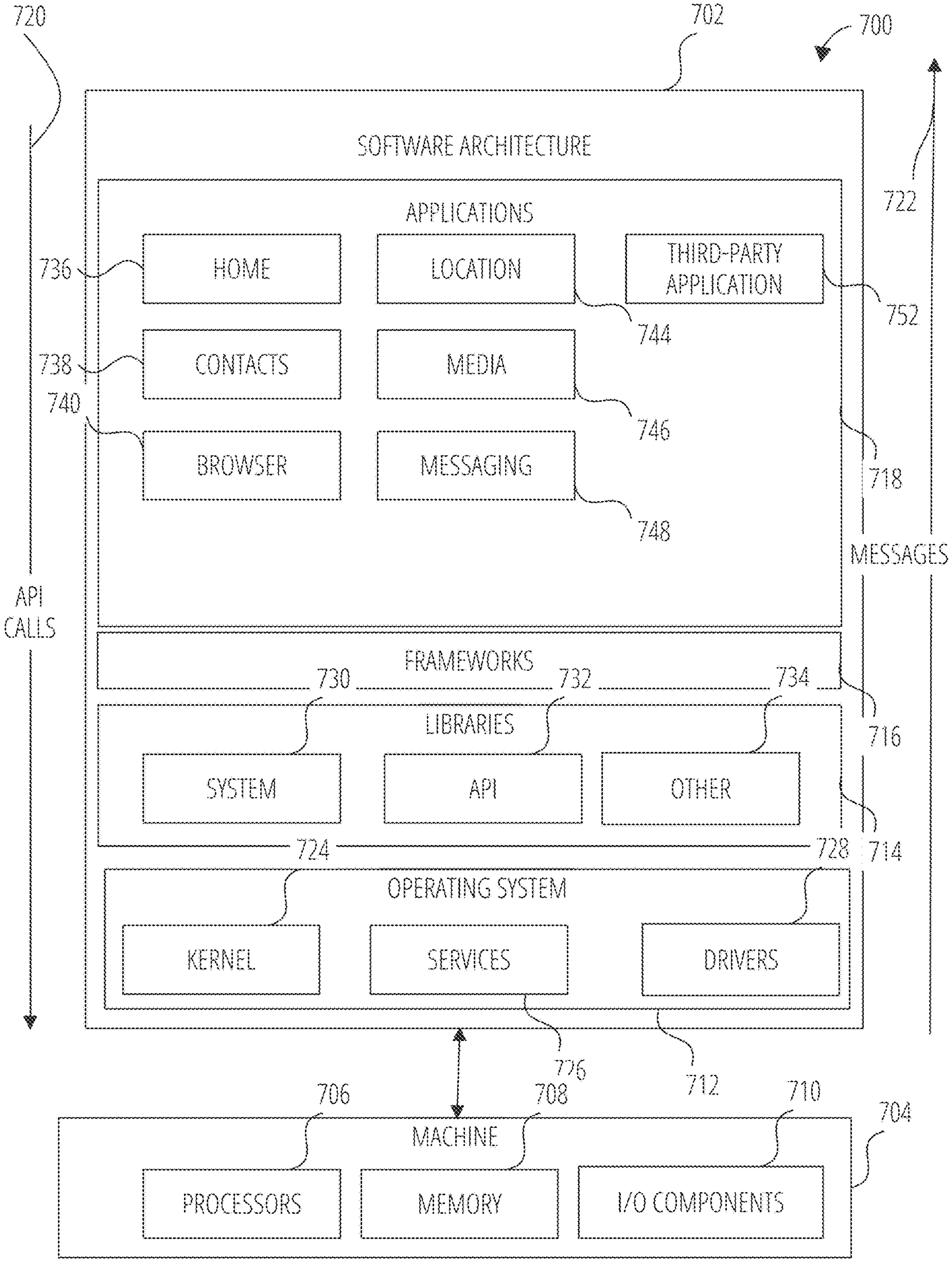
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a location application 744, a media application 746, a messaging application 748, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

Machine-Learning Pipeline

Figure 9:
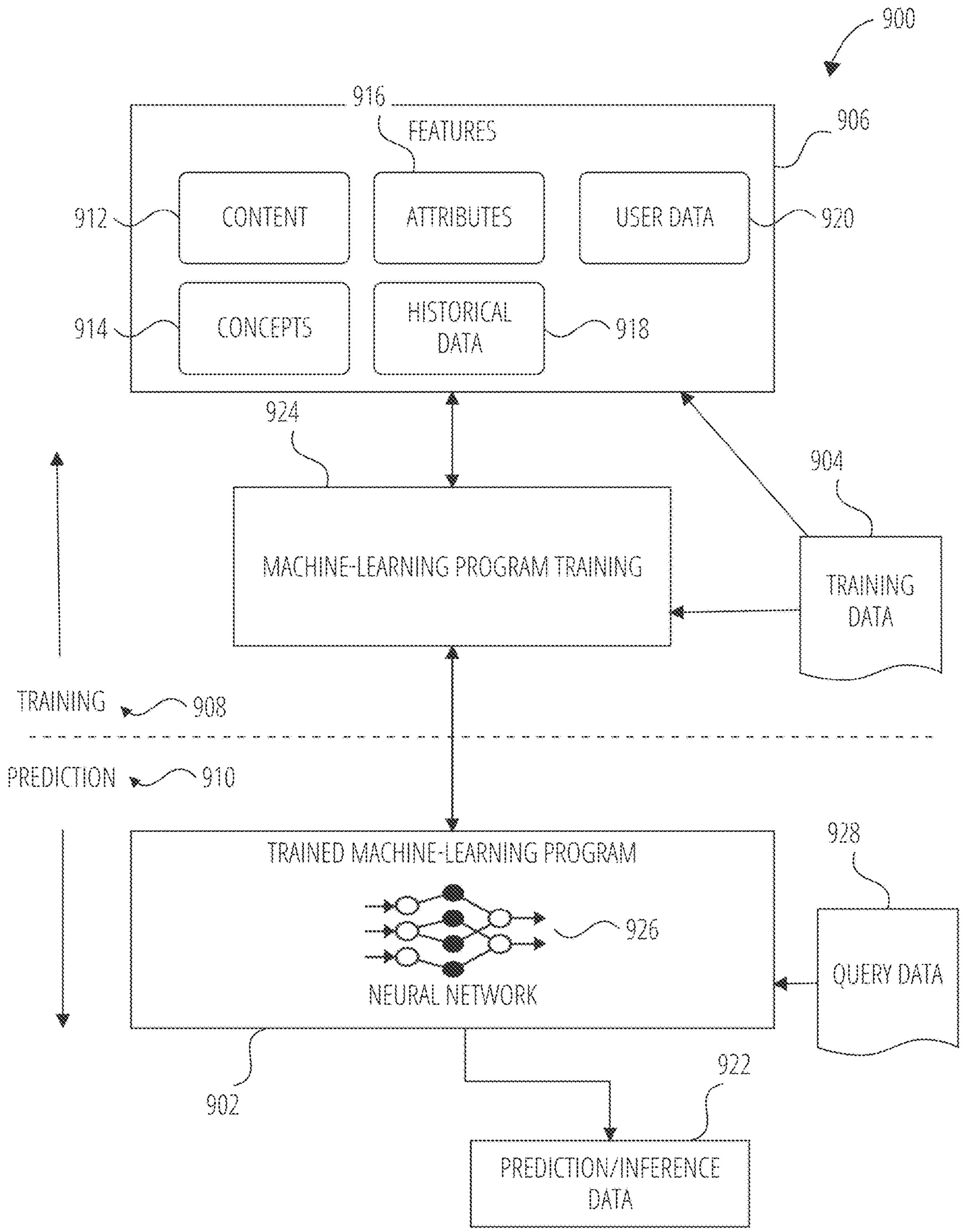
FIG. 9 illustrates training and use of a machine-learning program, according to some examples.

FIG. 9 is a flowchart depicting a machine-learning pipeline 900, according to some examples. The machine-learning pipelines 900 may be used to generate a trained model, for example the trained machine-learning program 902 of FIG. 9, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 8:
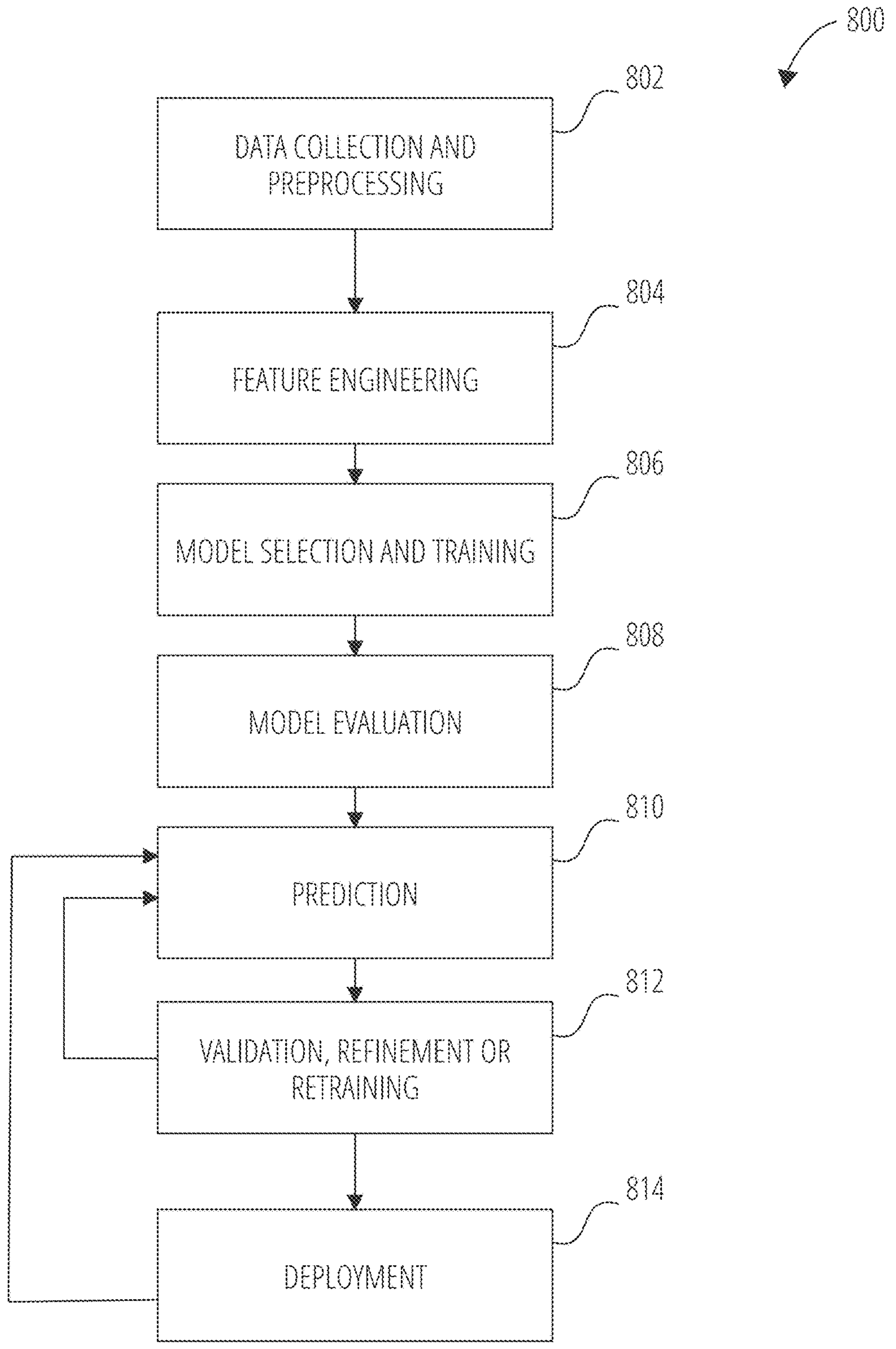
FIG. 8 illustrates a machine-learning pipeline, according to some examples.

Generating a trained machine-learning program 902 may include multiple types of phases that form part of the machine-learning pipeline 800, including for example the following phases illustrated in FIG. 8:

- Data collection and preprocessing 802: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.
- Feature engineering 804: This may include selecting and transforming the training data 904 to create features that are useful for predicting the target variable. Feature engineering may include (1) receiving features 906 (e.g., as structured or labeled data in supervised learning) and/or (2) identifying features 906 (e.g., unstructured or unlabeled data for unsupervised learning) in training data 904.
- Model selection and training 806: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.
- Model evaluation 808: This may include evaluating the performance of a trained model (e.g., the trained machine-learning program 902) on a separate testing dataset. This can help determine if the model is overfitting or underfitting and if it is suitable for deployment.
- Prediction 810: This involves using a trained model (e.g., trained machine-learning program 902) to generate predictions on new, unseen data.
- Validation, refinement or retraining 812: This may include updating a model based on feedback generated from the prediction phase, such as new data or user feedback.
- Deployment 814: This may include integrating the trained model (e.g., the trained machine-learning program 902) into a larger system or application, such as a web service, mobile app, or IoT device. This can involve setting up APIs, building a user interface, and ensuring that the model is scalable and can handle large volumes of data.

FIG. 9 illustrates two example phases, namely a training phase 908 (part of the model selection and trainings 806) and a prediction phase 910 (part of prediction 910). Prior to the training phase 908, feature engineering 804 is used to identify features 906. This may include identifying informative, discriminating, and independent features for the effective operation of the trained machine-learning program 902 in pattern recognition, classification, and regression. In some examples, the training data 904 includes labeled data, which is known data for pre-identified features 906 and one or more outcomes.

Each of the features 906 may be a variable or attribute, such as individual measurable property of a process, article, system, or phenomenon represented by a data set (e.g., the training data 904). Features 906 may also be of different types, such as numeric features, strings, vectors, matrices, encodings, and graphs, and may include one or more of content 912, concepts 914, attributes 916, historical data 918 and/or user data 920, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 908, the machine-learning pipeline 900 uses the training data 904 to find correlations among the features 906 that affect a predicted outcome or prediction/inference data 922.

With the training data 904 and the identified features 906, the trained machine-learning program 902 is trained during the training phase 908 during machine-learning program training 924. The machine-learning program training 924 appraises values of the features 906 as they correlate to the training data 904. The result of the training is the trained machine-learning program 902 (e.g., a trained or learned model).

Further, the training phase 908 may involve machine learning, in which the training data 904 is structured (e.g., labeled during preprocessing operations), and the trained machine-learning program 902 implements a relatively simple neural network 926 capable of performing, for example, classification and clustering operations. In other examples, the training phase 908 may involve deep learning, in which the training data 904 is unstructured, and the trained machine-learning program 902 implements a deep neural network 926 that is able to perform both feature extraction and classification/clustering operations.

A neural network 926 may, in some examples, be generated during the training phase 908, and implemented within the trained machine-learning program 902. The neural network 926 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 926 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 926 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 908, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 926 is iteratively trained by adjusting model parameters to minimize a specific loss function or maximize a certain objective. The system can continue to train the neural network 926 by adjusting parameters based on the output of the validation, refinement, or retraining block 812, and rerun the prediction 910 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 926 even after deployment 814 of the neural network 926. The neural network 926 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 910, the trained machine-learning program 902 uses the features 906 for analyzing query data 928 to generate inferences, outcomes, or predictions, as examples of a prediction/inference data 922. For example, during prediction phase 910, the trained machine-learning program 902 is used to generate an output. Query data 928 is provided as an input to the trained machine-learning program 902, and the trained machine-learning program 902 generates the prediction/inference data 922 as output, responsive to receipt of the query data 928. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 902 may be a generative AI model. Generative AI is a term that may refer to any type of artificial intelligence that can create new content from training data 904. For example, generative AI can produce text, images, video, audio, code or synthetic data that are similar to the original data but not identical.

Some of the techniques that may be used in generative AI are:

- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.
- Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.
- Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 922 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method performed by one or more hardware processors, the method comprising: accessing geolocation data from a mobile device associated with a first user, the geolocation data indicating a location of the first user; accessing digital out-of-home (DOOH) ad display data, the DOOH ad display data including a display timestamp, an identifier of the DOOH ad, and media content metadata describing a product or service featured in the DOOH ad; accessing transaction data associated with the first user, the transaction data including a acquisition timestamp, a merchant identifier, and a list of items acquired by the first user; applying the geolocation data and the DOOH ad display data to a first attribution model in order to determine that the first user was exposed to the DOOH ad; applying the transaction data and the determined ad exposure to a second attribution model in order to determine an impact score reflecting an influence of the DOOH ad to the acquisition by the first user; and adjusting an ad campaign based on the impact score.

In Example 2, the subject matter of Example 1 includes, wherein the second attribution model is configured to identify the product or service featured in the DOOH ad and correlate the same product or service acquired in the transaction data.

In Example 3, the subject matter of Examples 1-2 includes, wherein the first attribution model and the second attribution model are the same model.

In Example 4, the subject matter of Example 3 includes, wherein the first attribution model and the second attribution model are separate models with different inputs and outputs.

In Example 5, the subject matter of Examples 1~4 includes,) the acquisition timestamp and the display timestamp to receive a temporal and spatial correlation factor between ad exposure and the acquisition event.

In Example 6, the subject matter of Examples 1-5 includes, wherein the transaction data is accessed by the one or more hardware processors from a transaction datastore that is external to the one or more hardware processors, and the DOOH ad display data is accessed by the one or more hardware processors from a DOOH ad display datastore that is external to the one or more hardware processors, wherein the transaction data is in a different data format than the DOOH ad display data, the method further comprising: normalizing the transaction data and the DOOH ad display data, wherein applying the transaction data and the determined ad exposure to the second attribution model is further based on the normalized transaction data and DOOH ad display data.

In Example 7, the subject matter of Example 6 includes, wherein a transaction system associated with the transaction datastore does not have direct communication with a DOOH ad display system associated with the DOOH ad display datastore.

In Example 8, the subject matter of Examples 1-7 includes, wherein the transaction data is accessed by the one or more hardware processors from a first transaction datastore and a second transaction datastore that are both external to the one or more hardware processors, wherein first transaction data stored in the first transaction datastore is in a different data format than second transaction data stored in the second transaction datastore, the method further comprising: normalizing the first transaction data and the second transaction data, wherein applying the transaction data and the determined ad exposure to the second attribution model is further based on the normalized first transaction data and second transaction data, wherein a first transaction system associated with the first transaction datastore does not have direct communication with a second transaction system associated with the second transaction datastore.

In Example 9, the subject matter of Examples 1-8 includes, wherein applying the transaction data and the determined ad exposure to the second attribution model comprises: identifying, from the transaction data, an acquisition of a first acquired item; and identifying, from the DOOH ad display data, that the displayed ad promoted a first advertised item that is of the same type as the first acquired item but sold by a different entity than the entity associated with the first acquired item, wherein the attribution indicates influence but not a direct conversion from the first advertised item, wherein adjusting the ad campaign is further based on the attribution that indicates influence but not a direct conversion from the first advertised item.

In Example 10, the subject matter of Examples 1-9 includes, wherein the product or service featured in the DOOH ad is of the same type and brand as the item acquired by the first user in the transaction data.

In Example 11, the subject matter of Examples 1-10 includes, wherein the first attribution model is configured to: identifying a location of the first user based on the geolocation data; and determining that the first user was within a defined proximity range where the DOOH ad was displayed, wherein the transaction data indicates that the acquisition of the item by the first user occurred at the same location where the DOOH ad was displayed.

In Example 12, the subject matter of Example 11 includes, wherein the DOOH ad display data indicates that the location where the DOOH ad was displayed is a residential setting, and the transaction data indicates that the transaction occurred at a merchant location.

In Example 13, the subject matter of Examples 11-12 includes, wherein the DOOH ad display data indicates that the location where the DOOH ad was displayed is the same location as the location of the transaction indicated in the transaction data.

In Example 14, the subject matter of Examples 1-13 includes, wherein the DOOH ad display data specifies a location where the first DOOH ad was presented within physical boundaries of a first entity, the method further comprising: identifying a location of the first user by accessing the geolocation data from a mobile device associated with the first user as the first user moves within the physical boundaries of the first advertising entity; and determining a distance between the movement path of the first user and the location where the DOOH ad was displayed, wherein applying the geolocation data and the DOOH ad display data to the first attribution model includes determining that the distance falls within a predefined distance threshold.

In Example 15, the subject matter of Examples 1-14 includes, identifying that a first DOOH ad was presented on a first display at a first location associated with a first advertising entity; and identifying that a second DOOH ad was presented on a second display at a second location associated with a second advertising entity, wherein the first attribution model is configured: to correlate the first DOOH ad and the second DOOH ad with the acquisition of the first transaction item; and determining an attribution score for the first DOOH ad and the second DOOH ad, wherein the attribution score reflects a predicted contribution of each ad exposure to the acquisition of the first transaction item, wherein the first DOOH ad, the second DOOH ad, and the first transaction item are associated with a particular product or service.

In Example 16, the subject matter of Examples 1-15 includes, identifying that a first DOOH ad was presented on a first display at a first location associated with a first advertising entity; and identifying that a second DOOH ad was presented on a second display within a home of the first user; wherein the first attribution model is configured to: correlate the first DOOH ad and the second DOOH ad with the acquisition of the first transaction item; and determining an attribution score for the first DOOH ad and the second DOOH ad, wherein the attribution score reflects the contribution of each ad exposure to the acquisition of the first transaction item, wherein the first DOOH ad, the second DOOH ad, and the first transaction item are associated with a particular product or service.

In Example 17, the subject matter of Example 16 includes, wherein adjusting the ad campaign includes increasing the frequency or placement of advertisements for the first transaction item on the second display based on the impact score.

In Example 18, the subject matter of Examples 1-17 includes, wherein the attribution model includes a machine learning model trained to identify correlations between ad exposures and transaction data based on historical ad display records and historical transaction data.

Example 19 is a system comprising: at least one processor; and at least one memory component storing instructions that, when executed by the at least one processor, cause the at least one processor to perform operations comprising: accessing geolocation data from a mobile device associated with a first user, the geolocation data indicating a location of the first user; accessing DOOH ad display data, the DOOH ad display data including a display timestamp, an identifier of the DOOH ad, and media content metadata describing a product or service featured in the DOOH ad; accessing transaction data associated with the first user, the transaction data including a acquisition timestamp, a merchant identifier, and a list of items acquired by the first user; applying the geolocation data and the DOOH ad display data to a first attribution model in order to determine that the first user was exposed to the DOOH ad; applying the transaction data and the determined ad exposure to a second attribution model in order to determine an impact score reflecting an influence of the DOOH ad to the acquisition by the first user; and adjusting an ad campaign based on the impact score.

Example 20 is a non-transitory computer-readable storage medium storing instructions that, when executed by at least one processor, cause the at least one processor to perform operations comprising: accessing geolocation data from a mobile device associated with a first user, the geolocation data indicating a location of the first user; accessing DOOH ad display data, the DOOH ad display data including a display timestamp, an identifier of the DOOH ad, and media content metadata describing a product or service featured in the DOOH ad; accessing transaction data associated with the first user, the transaction data including a acquisition timestamp, a merchant identifier, and a list of items acquired by the first user; applying the geolocation data and the DOOH ad display data to a first attribution model in order to determine that the first user was exposed to the DOOH ad; applying the transaction data and the determined ad exposure to a second attribution model in order to determine an impact score reflecting an influence of the DOOH ad to the acquisition by the first user; and adjusting an ad campaign based on the impact score.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

In the example embodiments, it should be understood that the NFT system, the NFT system, and the various devices may be implemented in other manners. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the example embodiments may be integrated into one processing unit, or each of the units may exist alone physically, or two or more units may be integrated into one unit.

When the functions are implemented in the form of a software functional unit and sold or used as an independent product, the functions may be stored in a computer readable storage medium. Based on such an understanding, the technical solutions of example embodiments may be implemented in the form of a software product. The software product is stored in a storage medium, and includes several instructions for instructing a computing device to perform all or some of the steps or processes of the methods described in the example embodiments. The foregoing storage medium includes any medium that can store program code, such as a universal serial bus flash drive, removable hard disk, read only memory, random access memory, magnetic disc, and/or an optical disc.

In the described methods or block diagrams, boxes may represent events, steps, functions, processes, modules, messages, and/or state based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps describe herein may be separated into a number of sub-messages or sub-steps in other embodiments. Even further, some or all of the steps may be repeated, as necessary. Elements described as methods, steps, or processes similarly apply to systems, subsystems, or subcomponents, and vice versa. Reference to such a word as sending or receiving could be interchanged depending on the perspective of the particulars device. The described embodiments are considered to be illustrative and not restrictive. Example embodiments described as methods would similarly apply to systems, subsystems, or devices, and vice versa.

The various example embodiments are merely examples and are in no way meant to limit the scope of this disclosure. Variations of the innovations describe herein will be apparent to persons of ordinary skill in the art, such variations being within the intended scope. In particular features from one or more of the example embodiments may be selected to create alternative embodiments comprised of a sub-combination of features which may not be explicitly described. In addition, features from one or more of the described example embodiments may be selected and combined to create alternative example embodiments comprised of a combination of features which may not be explicitly described. Features suitable for such combinations and sub-combinations would be readily apparent a person skilled in the art. The subject matter describe herein intends to cover all suitable changes in technology.

What is claimed is:

1. A method performed by one or more hardware processors, the method comprising:

accessing geolocation data from a mobile device associated with a first user, the geolocation data indicating a location of the first user;

accessing digital out-of-home (DOOH) ad display data, the DOOH ad display data including a display timestamp, an identifier corresponding to a DOOH ad, and media content metadata describing a product or service featured in the DOOH ad;

accessing transaction data associated with the first user that is external to the one or more hardware processors, the transaction data including a acquisition timestamp, a merchant identifier, and a list of items acquired by the first user, the transaction data being in a different data format than the DOOH ad display data;

normalizing, by the one or more hardware processors, the geolocation data, the DOOH ad display data, and the transaction data into a unified data format to enable correlation across systems that do not natively share identifiers or data schemas, wherein a transaction system associated with the transaction datastore does not have direct communication with a DOOH ad display system associated with the DOOH ad display datastore, and wherein the transaction data and the DOOH ad display data are ingested asynchronously and time-aligned by the one or more hardware processors to enable correlation of temporally misaligned events;

applying the normalized geolocation data and the normalized DOOH ad display data to a first attribution model configured to suppress false exposure events caused by sensor inaccuracy using at least proximity thresholds or movement-based analysis in order to determine a predicted ad exposure of the first user to the DOOH ad;

applying the normalized transaction data and the predicted ad exposure to a second attribution model configured to computationally correlate temporally and spatially misaligned events originating from independent systems in order to determine an impact score reflecting an influence of the DOOH ad to an acquisition of the product or service by the first user; and adjusting an ad campaign based on the impact score.

2. The method of claim 1, wherein the second attribution model is configured to identify the product or service featured in the DOOH ad and correlate the same product or service acquired in the transaction data.

3. The method of claim 1, wherein a single model comprises the first attribution model and the second attribution model.

4. The method of claim 3, wherein the first attribution model and the second attribution model are separate models with different inputs and outputs.

5. The method of claim 1, wherein applying the transaction data and the predicted ad exposure to the second attribution model comprises identifying overlapping data points in (1) the location of the DOOH ad display and (2) the acquisition timestamp and the display timestamp to receive a temporal and spatial correlation factor between predicted ad exposure and the acquisition event.

6. The method of claim 1, wherein normalizing the transaction data and the DOOH ad display data comprises executing a data harmonization process that maps heterogeneous data fields from the transaction data and the DOOH ad display data.

7. The method of claim 1, wherein the transaction data is accessed by the one or more hardware processors from a first transaction datastore and a second transaction datastore that are both external to the one or more hardware processors, wherein first transaction data stored in the first transaction datastore is in a different data format than second transaction data stored in the second transaction datastore, the method further comprising:

normalizing the first transaction data and the second transaction data, wherein applying the transaction data and the predicted ad exposure to the second attribution model is further based on the normalized first transaction data and second transaction data, wherein a first transaction system associated with the first transaction datastore does not have direct communication with a second transaction system associated with the second transaction datastore.

8. The method of claim 1, wherein applying the transaction data and the predicted ad exposure to the second attribution model comprises:

identifying, from the transaction data, an acquisition of a first acquired item; and identifying, from the DOOH ad display data, that the displayed ad promoted a first advertised item that is of the same type as the first acquired item but sold by a different entity than the entity associated with the first acquired item, wherein the attribution indicates influence but not a direct conversion from the first advertised item, wherein adjusting the ad campaign is further based on the attribution that indicates influence but not a direct conversion from the first advertised item.

9. The method of claim 1, wherein the product or service featured in the DOOH ad is of the same type and brand as the item acquired by the first user in the transaction data.

10. The method of claim 1, wherein the first attribution model is configured to:

identifying a location of the first user based on the geolocation data; and determining that the first user was within a defined proximity range where the DOOH ad was displayed, wherein the transaction data indicates that the acquisition of the item by the first user occurred at the same location where the DOOH ad was displayed, thereby reducing false-positive ad exposure determinations caused by incidental user presence outside a viewable range of the DOOH ad.

11. The method of claim 10, wherein the DOOH ad display data indicates that the location where the DOOH ad was displayed is a residential setting, and the transaction data indicates that the transaction occurred at a merchant location.

12. The method of claim 10, wherein the DOOH ad display data indicates that the location where the DOOH ad was displayed is the same location as the location of the transaction indicated in the transaction data.

13. The method of claim 1, wherein the DOOH ad display data specifies a location where the first DOOH ad was presented within physical boundaries of a first entity, the method further comprising:

identifying a location of the first user by accessing the geolocation data from a mobile device associated with the first user as the first user moves within the physical boundaries of the first advertising entity; and determining a distance between the movement path of the first user and the location where the DOOH ad was displayed, wherein applying the geolocation data and the DOOH ad display data to the first attribution model includes determining that the distance falls within a predefined distance threshold, thereby excluding exposure events where a user path indicates physical separation from the DOOH ad preventing visual exposure.

14. The method of claim 1, further comprising:

identifying that a first DOOH ad was presented on a first display at a first location associated with a first advertising entity; and identifying that a second DOOH ad was presented on a second display at a second location associated with a second advertising entity, wherein the first attribution model is configured:

to correlate the first DOOH ad and the second DOOH ad with the acquisition of the first transaction item; and determining an attribution score for the first DOOH ad and the second DOOH ad, wherein the attribution score reflects a predicted contribution of each ad exposure to the acquisition of the first transaction item, wherein the first DOOH ad, the second DOOH ad, and the first transaction item are associated with a particular product or service, thereby enabling attribution across physically distinct display environments that do not share a common display or transaction system.

15. The method of claim 1, further comprising:

identifying that a first DOOH ad was presented on a first display at a first location associated with a first advertising entity; and identifying that a second DOOH ad was presented on a second display within a home of the first user;

wherein the first attribution model is configured to:

correlate the first DOOH ad and the second DOOH ad with the acquisition of the first transaction item; and determining an attribution score for the first DOOH ad and the second DOOH ad, wherein the attribution score reflects the contribution of each ad exposure to the acquisition of the first transaction item, wherein the first DOOH ad, the second DOOH ad, and the first transaction item are associated with a particular product or service, thereby enabling attribution despite differences in display ownership, location sensing, and exposure logging mechanisms.

16. The method of claim 15, wherein adjusting the ad campaign includes increasing the frequency or placement of advertisements for the first transaction item on the second display based on the impact score, thereby updating ad delivery parameters based on computed attribution confidence values generated by the attribution model.

17. The method of claim 1, wherein the attribution model includes a machine learning model trained to identify correlations between ad exposures and transaction data based on historical ad display records and historical transaction data, the machine learning model being configured to suppress false correlations caused by coincidental temporal overlap and incomplete sensor data, thereby increasing attribution accuracy in environments with unreliable or noisy location signals.

18. A system comprising:

at least one processor; and at least one memory component storing instructions that, when executed by the at least one processor, cause the at least one processor to perform operations comprising:

accessing geolocation data from a mobile device associated with a first user, the geolocation data indicating a location of the first user, accessing digital out-of-home (DOOH) ad display data, the DOOH ad display data including a display timestamp, an identifier corresponding to a DOOH ad, and media content metadata describing a product or service featured in the DOOH ad;

accessing transaction data associated with the first user that is external to the at least one processor, the transaction data including a acquisition timestamp, a merchant identifier, and a list of items acquired by the first user, the transaction data being in a different data format than the DOOH ad display data;

normalizing, by the at least one processor, the geolocation data, the DOOH ad display data and the transaction data into a unified data format to enable correlation across systems that do not natively share identifiers or data schemas, wherein a transaction system associated with the transaction datastore does not have direct communication with a DOOH ad display system associated with the DOOH ad display datastore, and wherein the transaction data and the DOOH ad display data are ingested asynchronously and time-aligned by the at least one processor to enable correlation of temporally misaligned events;

applying the normalized geolocation data and the normalized DOOH ad display data to a first attribution model configured to suppress false exposure events caused by sensor inaccuracy using at least proximity thresholds or movement-based analysis in order to determine a predicted ad exposure of the first user to the DOOH ad;

applying the normalized transaction data and the predicted ad exposure to a second attribution model configured to computationally correlate temporally and spatially misaligned events originating from independent systems in order to determine an impact score reflecting an influence of the DOOH ad to an acquisition of the product or service by the first user; and adjusting an ad campaign based on the impact score.

19. A non-transitory computer-readable storage medium storing instructions that, when executed by at least one processor, cause the at least one processor to perform operations comprising:

accessing geolocation data from a mobile device associated with a first user, the geolocation data indicating a location of the first user;

accessing digital out-of-home (DOOH) ad display data, the DOOH ad display data including a display timestamp, an identifier corresponding to a DOOH ad, and media content metadata describing a product or service featured in the DOOH ad;

accessing transaction data associated with the first user that is external to the at least one processor, the transaction data including a acquisition timestamp, a merchant identifier, and a list of items acquired by the first user, the transaction data being in a different data format than the DOOH ad display data;

normalizing, by the at least one processor, the geolocation data, the DOOH ad display data, and the transaction data into a unified data format to enable correlation across systems that do not natively share identifiers or data schemas, wherein a transaction system associated with the transaction datastore does not have direct communication with a DOOH ad display system associated with the DOOH ad display datastore, and wherein the transaction data and the DOOH ad display data are ingested asynchronously and time-aligned by the at least one processor to enable correlation of temporally misaligned events:

applying the normalized geolocation data and the normalized DOOH ad display data to a first attribution model configured to suppress false exposure events caused by sensor inaccuracy using at least proximity thresholds or movement-based analysis in order to determine a predicted ad exposure of the first user to the DOOH ad;

applying the normalized transaction data and the predicted ad exposure to a second attribution model configured to computationally correlate temporally and spatially misaligned events originating from independent systems in order to determine an impact score reflecting an influence of the DOOH ad to an acquisition of the product or service by the first user; and adjusting an ad campaign based on the impact score.

20. The system of claim 18, wherein normalizing the transaction data and the DOOH ad display data comprises executing a data harmonization process that maps heterogeneous data fields from the transaction data and the DOOH ad display data.

* * * * *